US011161944B2

(12) United States Patent
Tadiello et al.

(10) Patent No.: US 11,161,944 B2
(45) Date of Patent: Nov. 2, 2021

(54) ELASTOMERIC COMPOSITIONS COMPRISING SILICATE FIBRES WITH NEEDLE-SHAPED MORPHOLOGY OF NANOMETRIC SIZE AND TYRES FOR VEHICLES THAT COMPRISE THEM

(71) Applicants: PIRELLI TYRE S.p.A., Milan (IT); POLITECNICO DI MILANO, Milan (IT); UNIVERSITA' DEGLI STUDI DI MILANO BICOCCA, Milan (IT)

(72) Inventors: Luciano Tadiello, Milan (IT); Valeria Rosaria Cipolletti, Milan (IT); Luca Giannini, Milan (IT); Thomas Hanel, Milan (IT); Maurizio Galimberti, Milan (IT); Roberto Scotti, Milan (IT); Barbara Di Credico, Milan (IT); Franca Morazzoni, Milan (IT); Massimiliano D'Arienzo, Milan (IT); Irene Tagliaro, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 311 days.

(21) Appl. No.: 16/469,849

(22) PCT Filed: Dec. 18, 2017

(86) PCT No.: PCT/IB2017/058057
§ 371 (c)(1),
(2) Date: Jun. 14, 2019

(87) PCT Pub. No.: WO2018/116125
PCT Pub. Date: Jun. 28, 2018

(65) Prior Publication Data
US 2020/0095387 A1    Mar. 26, 2020

(30) Foreign Application Priority Data

Dec. 23, 2016 (IT) .......................... 102016000130904

(51) Int. Cl.
*C08J 3/22* (2006.01)
*C08K 3/011* (2018.01)
*B60C 1/00* (2006.01)
*C08K 3/06* (2006.01)
*C08K 3/36* (2006.01)
*C08K 7/10* (2006.01)
*C08L 7/00* (2006.01)
*C08L 9/02* (2006.01)
*C08L 9/06* (2006.01)

(52) U.S. Cl.
CPC .............. *C08J 3/22* (2013.01); *B60C 1/0016* (2013.01); *C08K 3/011* (2018.01); *C08K 3/06* (2013.01); *C08K 3/36* (2013.01); *C08K 7/10* (2013.01); *C08L 7/00* (2013.01); *C08L 9/02* (2013.01); *C08L 9/06* (2013.01); *B60C 2001/0033* (2013.01); *C08K 2201/011* (2013.01)

(58) Field of Classification Search
CPC ... C08J 3/22; C08K 3/011; C08K 3/06; C08K 3/36; C08K 7/10; B60C 1/0016; C08L 7/00
USPC ........................................................ 523/152
See application file for complete search history.

(56) References Cited

U.S. PATENT DOCUMENTS

| 4,029,633 | A | 6/1977 | Hagopian et al. |
| 6,040,364 | A | 3/2000 | Mabry et al. |
| 6,048,923 | A | 4/2000 | Mabry et al. |
| 6,075,084 | A | 6/2000 | Mabry et al. |
| 6,841,606 | B2 | 1/2005 | Yanagisawa et al. |
| 6,929,783 | B2 | 8/2005 | Chung et al. |
| 2014/0083588 | A1* | 3/2014 | Nahmias Nanni ........ B60C 1/00 152/458 |
| 2014/0196825 | A1* | 7/2014 | Nahmias Nanni ...... B60C 11/18 152/458 |
| 2015/0251501 | A1* | 9/2015 | Giannini ................... B60C 1/00 152/458 |
| 2015/0266344 | A1 | 9/2015 | Giannini et al. |

FOREIGN PATENT DOCUMENTS

| CN | 106009096 | 10/2016 |
| EP | 2 292 689 A1 | 3/2011 |
| JP | 2012-229280 | 11/2012 |
| JP | 2012-236878 | 12/2012 |
| WO | WO 2006/068078 A1 | 6/2006 |
| WO | WO 2006/080852 A1 | 8/2006 |

(Continued)

OTHER PUBLICATIONS

International Search Report form the European Patent Office in corresponding International Application No. PCT/IB2017/058057 dated Apr. 26, 2018.
Written Opinion of the International Searching Authority from the European Patent Office in corresponding International Application No. PCT/IB2017/058057 dated Apr. 26, 2018.
Pasbakhsh, P., et al. "EPDM/modified halloysite nanocomposites", Applied Clay Science, Elsevier, vol. 48, No. 3, (2010), pp. 405-413.

*Primary Examiner* — Doris L Lee
(74) *Attorney, Agent, or Firm* — Finnegan, Henderson, Farabow, Garrett & Dunner, L.L.P.

(57) ABSTRACT

The present invention regards a solid master elastomeric composition (masterbatch, MB) comprising silicate fibres with needle-shaped morphology of nanometric size, characterised by high fibre content and uniformity, a process advantageous for the preparation thereof and its use in manufacturing tyres for vehicles. Advantageously the present elastomeric composition allows minimising the drawbacks associated with the handling of the powdery fibres in the manufacturing of compounds for tyres, without altering the final performances thereof.

22 Claims, 2 Drawing Sheets

(56) References Cited

FOREIGN PATENT DOCUMENTS

| | | |
|---|---|---|
| WO | WO 2007/048424 A1 | 5/2007 |
| WO | WO 2009/099623 A1 | 8/2009 |
| WO | WO 2011/034589 A2 | 3/2011 |
| WO | WO 2014/068451 A1 | 5/2014 |
| WO | WO 2016/174628 A1 | 11/2016 |
| WO | WO 2016/174629 A1 | 11/2016 |

* cited by examiner

ELASTOMERIC COMPOSITIONS COMPRISING SILICATE FIBRES WITH NEEDLE-SHAPED MORPHOLOGY OF NANOMETRIC SIZE AND TYRES FOR VEHICLES THAT COMPRISE THEM This application is a national stage entry application under 35 U.S.C. § 371 based on International Application No. PCT/IB2017/058057, filed Dec. 18, 2017, and claims priority of Italian Patent Application No. 102016000130904, filed Dec. 23, 2016; the contents of each application is incorporated herein by reference.

FIELD OF THE INVENTION

The present invention regards a solid master elastomeric composition comprising silicate fibres with needle-shaped morphology of nanometric size, characterised by high fibre content and uniformity, a process for the preparation thereof and its use in manufacturing tyres for vehicles.

STATE OF THE ART

In the rubber industry, and more particularly in the tyre industry, it is known to add reinforcing fillers to the elastomeric compositions in order to improve the mechanical properties and the abrasion resistance of the elastomeric materials obtained from these via vulcanisation.

Due to its high reinforcing power, carbon black is the most commonly used filler in the field.

Other currently used reinforcing materials are the so-called "white" fillers, such as talc, kaolin, bentonite, titanium dioxide, silica, silicate fibres such as sepiolites and, recently, modified sepiolites, fillers which can partially or completely substitute the carbon black in the elastomeric materials and confer a lower hysteresis thereto, maintaining a sufficient reinforcement.

Among the white fillers, the silicate fibres, more particularly the sepiolites and modified sepiolites, have proven particularly promising in terms of hysteretic and mechanical properties of the elastomeric materials in which they are incorporated, in substitution of or in addition to the conventional fillers, and have shown that they are able to confer a reduced rolling resistance, improved rigidity and abrasion resistance to tyres.

In industry, the incorporation of these fibres of nanometric size in the elastomeric materials—carried out by directly mixing in the solid elastomeric matrix in classic batch mixers such as open mixers or internal mixers of tangential rotor type, for example the Banbury® mixers or with penetrating rotors of Intermix type—is difficult due to the high powdery nature of these fibres.

Indeed, once the residual water has been removed—which came from the process of extraction from the original minerals or from the subsequent derivatisation reactions—these fibres assume a powdery consistency, with a low apparent density which, for example in the case of organically modified sepiolite (Pangel B5 by Tolsa) is about 210 g/l and in the case of non-modified sepiolite (Pangel S9 by Tolsa) falls further, to 60 g/l.

Due to the high powdery nature, these fibres are easily dispersed in the air and are difficult to move and add to other components in the mixers, creating problems relating to dosage, dispersability, contamination of the work environment, potential toxicity for operators and even possible damage to the machines themselves.

In order to avoid these drawbacks, which generally occur in using powdery compounds in industrial plants, it is possible to incorporate them in solid master compositions (masterbatch MB). Such compositions trap the powders in dense matrices, rendering them easier to handle and manage.

For example, the patent application WO2007048424A1 describes the preparation of MB that are concentrated via incorporation of lamellar fillers, preferably bentonites, into solid elastomeric materials by means of continuous thermo-mechanical mixing. However, this method—in addition to using a considerable amount of energy—also does not appear to resolve the difficulties associated with the use of powdery fillers since the latter must still be moved and added in powder state to the continuous mixer.

The documents WO2009/099623, WO2011/034589, EP2292689, U.S. Pat. Nos. 4,029,633, 6,075,084, 6,048,923, 6,040,364, 6,929,783, WO2006/068078 and WO2006/080852 describe continuous processes for preparing elastomeric MB by wet mixing flows of rubber lattices and of carbon black suspensions, processes characterised by specific flow speed and pressures, by the carbon black surface area, by the geometries of the equipment, by the times and temperatures and by the subsequent operations of re-grinding and dehydration of the coagulations. These processes are however complex and difficult to actuate since the formation of the coagulation, which generally does not require acids or salts, is stated to depend on the optimisation of the energy imparted to the flows, energy which is affected by many variables including the speed thereof, the specific geometries of the reactors and the operating temperatures. In operation, this involves strictly controlled conditions and processes that are not very flexible with respect to the discontinuous processes.

The document U.S. Pat. No. 6,841,606 illustrates the preparation of MB from rubber latex, made to pre-react with agents capable of separating the amide bonds, and fillers selected from among carbon black, silica or inorganic fillers. In the experimental part, MB are described comprising carbon black, silica or aluminium hydroxide.

SUMMARY OF THE INVENTION

The Applicant has set the objective of resolving the problems connected with the incorporation of powdery needle-shaped silicate fibres in the elastomeric compositions for tyres by means of the preparation of master compositions with elastomeric matrix, ideally concentrated and uniform, comprising the same fibres, possibly added in non-pulverulent form, by using simple machinery and processes, preferably discontinuous, easily reproducible and possibly without using coagulants like acids or salts.

The Applicant has however encountered that it is not at all simple to obtain master compositions with the desired requirements, even in the case of carbon black, one of the most studied of the reinforcing materials. Indeed, in the conventional conditions tested by the Applicant, i.e. via simple mixing of suspensions of carbon black and rubber lattices, with ratios between carbon black and rubber up to 0.4:1, an only partial coagulation of the latex is obtained, with overall yields in MB that are unsatisfactory or, via acid addition, non-uniformity of the coagulation.

By conducting analogous experiments with modified sepiolite fibres, with weight ratios between fibres and rubber up to 0.2:1, the Applicant once again observed, without acid, coagulation of only one part of the material, with final yields that are decidedly low, or complete but non-uniform coagulation in the presence of acid, with formation of darker coagulations together with others clearly lighter.

The initial experience of the Applicant showed that the mixture comprising 2.5 phr of sepiolite fibres made of latex did not coagulate (Ex. 2a), while from 5 phr upward it coagulated too quickly and only partially, in fact leading to a MB with a higher fibre content in relation to the theoretical, non-uniform and with low yields (see in Table 2, examples 2b-2d). These observations have led to thinking that a low fibre/latex ratio was more suitable for controlling the precipitation, i.e. to prevent the saturation of the system and thus the early, non-uniform formation of the coagulation before the fibres were suitably dispersed, with respect to the use of a high filler content, instead deemed responsible for an overly quick precipitation of the rubber and for the non-uniform incorporation of the fibres.

Also the general knowledge on the dispersibility of the nanomaterials in MB—according to which the most concentrated systems are the most unstable ones, which tend to coalesce very quickly and which are thus less controllable (see for example Terence Cosgrove, Colloid Science: Principles, Methods and Applications, Wiley, 2010)—facilitates the selection to use low quantities of fibres in order to confer uniformity to the coagulation.

The Applicant has instead surprisingly found that by operating with high ratios of fibres in relation to the latex, in particular in relation to its rubber content, it is possible to obtain concentrated and uniform MB, with nearly quantitative yields, starting from lattices and suspensions of nanometric fibres with needle-shaped morphology, in particular sepiolite and modified sepiolite fibres, with a process preferably discontinuous, simple and easily reproducible. From the experimental experience of the Applicant, the behaviour of the silicate fibres in these processes of coagulation appeared decidedly different from that of carbon black or silica.

While not wishing to be tied to any specific explanation, the Applicant assumes that the differences in the three-dimensional structure of the aggregates of the fillers—i.e. between the cluster structures of the carbon black and silica and the compact parallel bands of the fibres—can play a decisive role in the different behaviour of the coagulation.

A first aspect of the present invention therefore consists of a process, preferably discontinuous, for the preparation of a solid master elastomeric composition (masterbatch), comprising silicate fibres of nanometric size with needle-shaped morphology and at least one diene elastomer, which comprises
  providing said fibres,
  providing an elastomeric latex comprising at least said diene elastomer and an aqueous phase,
  said fibres being in a weight ratio of at least 0.5:1 in relation to the weight of the elastomer present in the latex,
  placing said fibres and said latex in contact, to yield an aqueous suspension,
  maintaining or possibly bringing the pH of the aqueous suspension to a value comprised between 7.5 and 12.0.
  maintaining or possibly bringing the total volume of said aqueous suspension to a volumetric ratio in relation to the weight of the fibres, comprised between 10:1 and 30:1 ml/g, to yield a final suspension (C)
  allowing said elastomeric composition to precipitate and separate from said final suspension.

A second aspect of the present invention consists of a solid master elastomeric composition, obtainable according to the process in accordance with the first aspect of the invention.

A third aspect of the present invention consists of a vulcanisable elastomeric composition for tyre components comprising at least
  (a) 100 phr of at least one diene elastomer
  (b) 10 to 200 phr of a solid master elastomeric composition in accordance with the second aspect of the invention,
  (c) 0 to 120 phr of a standard reinforcing filler,
  (d) 0.1 to 15 phr of a vulcanising agent, and
  (e) 0.1 to 20 phr of a coupling agent.

A fourth aspect of the present invention consists of a tyre component comprising a vulcanisable elastomeric composition according to the third aspect of the invention, or vulcanised, obtainable by vulcanisation thereof.

A fifth aspect of the present invention consists of a tyre for vehicle wheels comprising at least one component according to the fourth aspect of the invention.

DETAILED DESCRIPTION OF THE INVENTION

The present invention is characterised by one or more of the following preferred aspects, taken separately or in combination.

For the purpose of the present description and following claims, the term "phr" (parts per hundreds of rubber) signifies the parts by weight of a specific component of the vulcanisable elastomeric composition per 100 parts by weight of the diene elastomer polymer.

The process for the preparation of a solid master elastomeric composition according to the present invention is a preferably discontinuous process, also indicated as a batch process.

With discontinuous process, it is intended a process in which the components of the composition are periodically fed to a suitable apparatus, in predefined quantities (batches) and placed in contact for a predetermined time so as to obtain the elastomeric composition. Once obtained, the elastomeric composition is completely unloaded from the apparatus in a single solution.

Apparatuses suitable for the preparation of the present solid master elastomeric composition are for example the mixers IKA Master Plant MP 10 or Silverson 700X.

Alternatively, the present master elastomeric composition can be prepared with continuous processes, in which the conditions reported in the present description are respected.

With the term solid master elastomeric composition or masterbatch (MB), it is intended a concentrated solid composition with elastomeric matrix comprising silicate fibres of nanometric size with needle-shaped morphology.

The process according to the invention provides for providing "silicate fibres of nanometric size with needle-shaped morphology".

With the term "fibres with needle-shaped morphology" it is intended the fibres having a size (length) much larger than the diameter or the maximum size of the cross section. In particular, it is intended that said fibres have a ratio between the greater size (length) and the diameter or the maximum size of the cross section (aspect ratio) of at least 2:1, preferably of at least 3:1, more preferably of at least 5:1 or at least 10:1.

Preferably the fibres have an aspect ratio not greater than 1000:1, more preferably not greater than 100:1.

Preferably said ratio is evaluated by microscopic observation, preferably conducted on at least 100 fibres.

Preferably at least 70%, 80%, 90% of the fibres have the aforesaid aspect ratio. With the expression "nanometric size" referred to the fibres, it is intended that the fibres have a diameter or maximum size of the cross section smaller than 500 nm.

Preferably, said fibres have a diameter or a maximum size of the cross section comprised between 1 and 100 nm, more preferably between 5 and 50 nm, even more preferably between 15 and 20 nm.

Preferably, said fibres have a length smaller than 10 micron, more preferably comprised between 0.1 and 10 micron, even more preferably between 0.1 and 5 micron.

The silicate fibres with needle-shaped morphology are distinguished from the lamellar silicates, such as bentonite, halloysite, vermiculite or hydrotalcite, at least for the aspect ratio. More particularly, considering a particle having three dimensions a, b, c where a>b>c, a particle can be conveniently defined lamellar in which (3×a/b)<b/c while a particle can be defined needle-shaped in which (2×a/b)>b/c.

The silicate fibres of nanometric size with needle-shaped morphology are selected from the group that consists of silicate fibres of magnesium and/or aluminium and/or of calcium and mixtures thereof.

Preferably the silicate fibres of nanometric size with needle-shaped morphology are selected from among phyllosilicates 2:1 characterised by a structure with "inverted ribbons" as described in "Bergaya, F., Jaber, M. and Lambert, J.-F. (2011) Clays and Clay Minerals, in Rubber-Clay Nanocomposites: Science, Technology, and Applications (ed M. Galimberti), John Wiley & Sons, Inc., Hoboken, N.J., USA. doi: 10.1002/9781118092866.ch1"

Preferably the silicate fibres of nanometric size with needle-shaped morphology are selected from among sepiolite fibres, modified sepiolite fibres, palygorskite (also known as attapulgite) fibres, wollastonite fibres, imogolite fibres and mixtures thereof, more preferably they are sepiolite fibres, modified sepiolite fibres or mixtures thereof.

Generally sepiolite has needle-shaped form and aspect ratios from 3:1 to 1000:1, more commonly from 5:1 to 100:1.

Generally, wollastonite has needle-shaped form and aspect ratios from 3:1 to 20:1, more commonly from 10:1 to 20:1

Generally, imogolite has needle-shaped form and aspect ratios from 5:1 to 100:1, more commonly from 5:1 to 50:1.

Examples of silicate fibres, which can be used according to the present invention, are sepiolites sold by Tolsa Group (http://www.tolsa.com/) with the name Pangel S9 or Pansil 100.

In the present context, with the phrase "silicate fibres of nanometric size with needle-shaped morphology", it is also intended the modified fibres, i.e. the fibres obtainable starting from silicate fibres of nanometric size with needle-shaped morphology via reaction of partial acid degradation, of partial removal of the magnesium, of derivatisation—such as salification with organic compounds or silanisation—or of surface deposition for example with amorphous silica.

The silicate fibres of nanometric size with modified needle-shaped morphology are obtainable from silicate fibres of nanometric size with needle-shaped morphology selected from among sepiolite fibres, palygorskite (also known as attapulgite) fibres, wollastonite fibres, and mixtures thereof, more preferably they are modified sepiolite fibres or mixtures thereof.

In the present context, with "modified silicate fibres of nanometric size with needle-shaped morphology", it is intended for example the fibres modified via acid treatment with partial removal of the magnesium up to a final content thereof comprised between 3.8% and 12%, which substantially preserves the needle-shaped morphology and the original crystalline structure, described and exemplified in the patent application WO2016/174629A1 (in particular from p. 9 to p. 15 and from p. 30 to p. 36), on behalf of the Applicant, incorporated herein for reference.

Possibly, these fibres modified with acids can be further derivatised for example via addition of at least one silanising agent to the acid treatment suspension of the fibres. Preferably, the silanising agent is selected from among mono- or bifunctional silanes with one, two or three hydrolysable groups such as bis-(triethoxysilylpropyl)disulphide (TESPD), bis[3-(triethoxysilyl)propyl]tetrasulphide (TESPT), 3-thio-octanoyl-1-propyltriethoxysilane (NXT), Me2Si(OEt)2), Me2PhSiCl, Ph2SiCl2, more preferably it is selected between TESPD and TESPT.

Other examples of suitable modified fibres are the silicate fibres with needle-shaped morphology of nanometric size comprising amorphous silica deposited on the surface, described and exemplified in the patent application WO2016/174628A1 (in particular from p. 7 to p. 12 and from p. 22 to p. 23) on behalf of the Applicant, incorporated herein for reference, or the sepiolite fibres organically modified via reaction with quaternary ammonium salts (talloyl benzyl dimethyl ammonium chloride) sold by Tolsa with the name Pangel B5.

Finally, with the term "silicate fibres of nanometric size with needle-shaped morphology" it is also intended possible mixtures of one or more of said fibres and/or of one or more of said modified fibres.

Preferably said "silicate fibres of nanometric size with needle-shaped morphology" are sepiolite fibres or sepiolite fibres modified, as a non-limiting example, via treatment with acids, described in the abovementioned documents WO2016/174629A1 and IT102016000108318, via derivatisation with quaternary ammonium salts (e.g. Pangel B5 by Tolsa) or via deposition on the surface of silica originating according to the process reported in the document WO2016/174628A1. In order to minimise the drawbacks associated with the handling of the powder, the present silicate fibres of nanometric size with needle-shaped morphology are preferably provided in wet form, i.e. with a high content of residual water, for example comprised between 50% and 95% by weight, which can be determined for example by thermogravimetric analysis.

The use of wet fibres, for example coming from preceding operations in aqueous phase of fibre extraction from the original minerals, or fibre modification, allows avoiding a drying step, with clear benefits in terms of times and costs.

The process according to the invention provides for providing an elastomeric latex comprising at least one diene elastomer and an aqueous phase.

The elastomeric latex can be a natural or synthetic latex, preferably it is a natural latex (natural rubber or NR) for example obtained from tropical plants of the Euphorbiaceae family such as Hevea Brasiliensis and Hevea Guaianensis.

Preferably, elastomeric latex has an elastomer content ranging from 10% to 60%, preferably at least 15%, at least 30%, at least 40% w/w.

Possibly, the latex can be diluted with water before being placed in contact with the fibres. Preferably the latex, if it is diluted via addition of water, has an elastomer content after dilution comprised between 10% and 60% w/w.

Generally, in the possible dilution of the latex, the optimal volumetric ratio for the precipitation is taken under consideration, which one desires to impart to the final aqueous suspension.

Preferably the elastomeric latex has a pH comprised between 9 and 12, more preferably between 9 and 11.

Preferably the elastomeric latex comprises basic substances, more preferably ammonia, which maintain the pH of the latex constant in a range from 9 to 12 and stabilise it. The elastomeric latex of commercial natural rubber is in fact also named based on the ammonia content, such as latex grade HA, with high ammonia content, or MA with medium content.

The elastomeric latex comprises at least one diene elastomer, generally it comprises mixtures of two or more diene elastomers.

Preferably the at least one diene elastomer present in the latex is selected from among natural rubber (NR), styrene-butadiene rubber (SBR) and mixtures thereof. Commercial examples of elastomeric lattices are the latex Von Bundit MA (60% elastomer, pH 8-11) and Von Bundit HA (60% elastomer, pH 9-12), and the latex Centex FA (60% elastomer, pH 9-12).

In the present process, the weight ratio between fibres and latex elastomer has been shown to be important for the obtainment of uniform and quantitative coagulations.

Preferably the weight ratio between fibres and latex elastomer is at least 0.6:1, at least 0.7:1, at least 0,8:1 or at least 0.9:1.

Preferably the weight ratio between fibres and latex elastomer is comprised in the range of 0.5:1 to 1.5:1, from 0.7:1 to 1.3:1, from 0.9:1 to 1.1:1, more preferably it is around 1:1.

Preferably the fibres are provided in the process and are then present in the solid master elastomeric composition, in a quantity of at least 50 phr, of at least 55 phr, of at least 60 phr, of at least 70 phr, more preferably of at least 80 phr, of at least 90 phr or at least 100 phr, per 100 parts by weight of the diene elastomer.

Preferably the fibres are provided in the process and are then present in the solid master elastomeric composition, in a quantity comprised between 50 and 200 phr, preferably between 60 and 150 phr, more preferably between 80 and 120 phr, per 100 parts by weight of the diene elastomer.

The fibre quantity to be provided for the preparation of the above-indicated present solid master composition is intended as referred to the weight of the dried fibres, i.e. with a content of residual water lower than 10%, preferably lower than 5%.

Preferably, in the present process wet fibres are used, comprising residual water, from preceding treatments in aqueous phase and in high quantity, generally in the range of 50 to 95%. The content of residual water can be easily determined by TGA and considered in calculating the actual weight of the fibres necessary for respecting the aforesaid weight ratios between fibres and elastomer.

In the present process, the fibres are placed in contact with the elastomeric latex to yield an aqueous suspension.

In one embodiment, the fibres can be added as is, without solvent, to the latex so long as the correct volumetric ratios of the final suspension are respected, by possible previous dilution of the latex or addition of further aqueous phase after the addition of the fibres.

Preferably, in the present process, the coagulation medium is essentially aqueous.

Preferably, the fibres are previously suspended in water, by means of the use of suitable mixing techniques such as sonication (ultrasound), mechanical stirring, magnetic stirring, impeller stirring or other means suitable for yielding a uniform aqueous suspension (A).

Preferably the mixing to yield the suspension (A) is prolonged for a time from 5 to 60 minutes, preferably from 10 to 30 minutes. In the case of mechanical stirring, the number of revolutions is preferably maintained between 200 and 1000 rpm.

Preferably, for the preparation of the suspension (A), deionised or distilled water is used.

Preferably, the aqueous suspension (A) comprises said fibres in a quantity in relation to water comprised between 10 and 100 WI, more preferably between 30 and 60 g/l.

The elastomeric latex can be used as is or suitably diluted with water to yield a diluted suspension (B), preferably up to having an elastomer content comprised between 5% and 60%, preferably between 15% and 60% (w/v).

Preferably, the fibres are added in aqueous suspension form (A).

In the present process the aqueous suspension (A) can be added to the elastomeric latex or to the suspension (B) (direct addition) or, alternatively, the elastomeric latex or the suspension (B) can be added to the suspension (A) (inverse addition) to yield an aqueous suspension.

The direct or inverse addition is generally carried out over a time period ranging from a few minutes to 30', also as a function of the reaction scale.

The Applicant has observed that by carrying out the inverse addition of the suspension (B)—i.e. by adding the suspension (B) of the latex to the suspension (A) of the fibres—preferably in multiple successive aliquots—the master composition is obtained with optimal yields, high uniformity and a particularly fine coagulation size.

A fine coagulation, isolatable by means of filtration with press filters, is particularly advantageous since it is easily washable.

Alternatively, by carrying out the direct addition—i.e. by adding the suspension (A) of the fibres to the suspension (B) of the latex—it is possible to obtain a larger coagulation, which has proven to be advantageous since it is easier to collect.

Preferably, the fibres are placed in contact with the latex under stirring and mixed for the entire duration of the coagulation of the latex and of the precipitation of the master elastomeric composition.

Preferably the precipitation is conducted under stirring.

Preferably the precipitation occurs in a time comprised between about 5 and 30 minutes.

Preferably the coagulation of the latex is carried out at a temperature comprised between 10 and 50° C., more preferably between 20 and 30° C.

Preferably the volumetric ratio of the aqueous suspension (C) obtained by placing the fibres in contact with the elastomeric latex, expressed as volume of aqueous suspension in relation to the weight of the fibres, is comprised between 15:1 and 25:1 ml/g, more preferably between 20:1 and 25:1 ml/g. This volumetric ratio can be obtained by suitably selecting the volume of the possible suspension of the fibres (A), of the latex or of the suspension (B) or, possibly, by adding other water to the suspension prepared by placing the suspension (A) in contact with the latex or the suspension (B), or if necessary removing water via evaporation from the same suspensions.

Preferably the pH of the suspension obtained by placing the fibres in contact with the elastomeric latex is comprised in a range from 7.5 to 11.

Preferably, said pH range is obtained by mixing the commercial latex, which generally has a pH comprised between 8 and 12, with the possible suspension (A) of the fibres, possible further water and, if necessary, correcting the pH via addition of bases or acids.

Preferably the coagulation and precipitation of the elastomeric composition do not require the addition of any conventional trigger, such as the addition of acids or salts.

Preferably, the precipitated master composition is separated from the aqueous phase via spontaneous decantation or centrifugation, followed by removal of the aqueous phase via suction or filtration.

Preferably, the precipitated master composition is filtered and, preferably, washed up to neutrality.

Finally, the composition is preferably dried, e.g. in an oven, possibly under vacuum, up to constant weight.

Preferably the solid master elastomeric composition of the present invention is essentially only constituted by the elastomeric matrix and by said fibres.

In particular, the solid master elastomeric composition, preferably obtainable according to the process of the invention, consists of
100 phr of at least one diene elastomer and
at least 50 phr, 60 phr, 70 phr, 80 phr or 90 phr of silicate fibres of nanometric size with needle-shaped morphology.

Preferably, said solid master elastomeric composition consists of
100 phr of at least one diene elastomer and
from 50 to 200 phr, more preferably from 60 to 150 phr of silicate fibres of nanometric size with needle-shaped morphology.

Preferably said fibres are sepiolite fibres or modified sepiolite fibres or mixtures thereof.

Preferably, the solid master elastomeric composition is characterised by a good uniformity of distribution of the fibres in the elastomeric matrix, already visibly detectable in terms of colour uniformity of the coagulations.

The present solid master elastomeric composition according to the invention allows the easy incorporation of the silicate fibres of nanometric size with needle-shaped morphology in elastomeric compositions for tyres, avoiding all the drawbacks associated with the use of these previously mentioned powdery fibres.

Preferably the vulcanisable elastomeric composition for tyre components comprises at least
(a) 100 phr of at least one elastomer
(b) 10 to 200 phr of a solid master elastomeric composition in accordance with the second aspect of the invention,
(c) 0 to 110 phr of a standard reinforcing filler,
(d) 0.1 to 12 phr of a vulcanising agent, and
(e) 0.1 to 18 phr of a coupling agent.

The vulcanisable elastomeric composition for tyre components according to the present invention is characterised by one or more of the following preferred aspects taken separately or in combination with each other.

The vulcanisable elastomeric composition for tyre components according to the present invention comprises 100 phr of at least (a) one diene elastomer polymer.

Preferably, the diene elastomer polymer (a) which can be used in the present invention can be selected from those commonly used in elastomeric materials crosslinkable with sulphur, which are particularly suitable for producing tyres, i.e. from elastomeric polymers or copolymers with an unsaturated chain having a glass transition temperature (Tg) generally lower than 20° C., preferably comprised in the range of 0° C. to −110° C. These polymers or copolymers can be of natural origin or they can be obtained by means of polymerisation in solution, polymerisation in emulsion or polymerisation in gaseous phase of one or more conjugated diolefins, possibly mixed with at least one comonomer selected from among monovinylarenes and/or polar comonomers in a quantity not greater than 60% by weight.

The conjugated diolefins generally contain from 4 to 12, preferably from 4 to 8 carbon atoms and they can be selected for example from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof.

1,3-butadiene and isoprene are particularly preferred.

Monovinylarenes, which may be used as comonomers, generally contain from 8 to 20, preferably from 8 to 12 carbon atoms and they can be selected for example from: styrene; 1-vinylnaphthalene; 2-vinylnaphthalene; various alkyl, cycloalkyl, aryl, alkylaryl or arylalkyl derivatives of styrene such as α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, and mixtures thereof.

Styrene is particularly preferred.

Polar momonomers which may be used can be selected for example from among: vinylpyridine, vinylquinoline, acrylic acid and alkylacrylic acid esters, nitriles, or mixtures thereof, such as methyl acrylate, ethyl acrylate, methyl methacrylate, ethyl methacrylate, acrylonitrile and mixtures thereof.

Preferably, the diene elastomer polymer (a) which can be used in the present invention can for example be selected from among: cis-1,4-polyisoprene (natural or synthetic, preferably natural rubber), 3,4-polyisoprene, polybutadiene (in particular polybutadiene with a high content of 1,4-cis), possibly halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

According to a preferred embodiment, said vulcanisable elastomeric composition comprises at least 10% by weight, preferably between 20% by weight and 100% by weight of natural rubber, in relation to the total weight of said at least one diene elastomer polymer (a), of natural rubber.

The aforesaid vulcanisable elastomeric composition may comprise at least one elastomer polymer of one or more monoolefins with an olefin comonomer or derivatives thereof (a'). The monoolefins can be selected from among: ethylene and α-olefins generally containing from 3 to 12 carbon atoms, such as propylene, 1-butene, 1-pentene, 1-hexene, 1-octene and mixtures thereof. The following are preferred: copolymers between ethylene and an α-olefin, possibly with a diene; isobutene homopolymers or copolymers thereof with small quantities of a diene, which may be at least in part halogenated. The diene possibly present generally contains from 4 to 20 carbon atoms and is preferably selected from among: 1,3-butadiene, isoprene, 1,4-hexadiene, 1,4-cyclohexadiene, 5-ethylidene-2-norbornene, 5-methylene-2-norbornene, vinylnorbornene and mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

A diene elastomer polymer (a) can also be used, or an elastomer polymer (a') functionalised by means of reaction with suitable terminating agents or coupling agents. In particular, the diene elastomer polymers obtained by means of anionic polymerisation in the presence of an organometallic initiator (in particular an organolithium initiator) can be functionalised by making the residual organometallic groups derived from the initiator react with suitable terminating agents or coupling agents such as imines, carbodiimides, tin alkyl halides, substituted benzophenones, alkoxysilanes or aryloxysilanes.

The present vulcanisable elastomeric composition comprises (b) a solid master elastomeric composition comprising silicate fibres with needle-shaped morphology of nanometric size, according to the invention.

The solid master elastomeric composition of the invention used in a quantity generally comprised between 10 and 200 phr allows introducing 5 to 100 phr of fibres in the vulcanisable elastomeric composition for tyres, without encountering all those drawbacks deriving from directly managing and incorporating the pulverulent material into a solid rubber. Given the same mixing conditions and times, the master composition of the present invention allows a comparable dispersion of the fibres in the elastomeric matrix of the vulcanisable composition for tyres.

The preferences expressed above for the process of preparation and for the solid master elastomeric composition are equally applicable, when pertinent, to the solid master elastomeric composition incorporated here in the vulcanisable elastomeric composition for tyre components.

The vulcanisable elastomeric composition according to the present invention can also comprise (c) a standard reinforcing filler.

With the term "standard reinforcing filler" it is intended a reinforcing filler commonly used in the tyre field, preferably selected from among carbon black, precipitated amorphous silica, amorphous silica of natural origin, such as diatomaceous earth, calcium carbonate, titanium dioxide, talc, alumina, kaolin and mixtures thereof.

Preferably, the standard reinforcing filler (c) is carbon black having a surface area not less than 20 m²/g (determined by STSA—statistical thickness surface area according to ISO 18852:2005).

Preferably, said reinforcing filler of carbon black (c) is present in the vulcanisable elastomeric composition in a quantity comprised between 1 phr and 120 phr, preferably between 20 phr and 90 phr.

Preferably, the standard reinforcing filler is silica, selected from among a pyrogenic silica or preferably a precipitated silica, with a surface area BET (measured according to the Standard ISO 5794/1) comprised between 50 m²/g and 500 m²/g, preferably between 70 m²/g and 200 m²/g.

Preferably, the standard reinforcing filler (c) is present in the vulcanisable elastomeric composition in a quantity generally comprised between 1 phr and 120 phr, preferably between 20 phr and 90 phr.

Preferably, the overall quantity of reinforcing materials, coming from the solid master elastomeric composition (b) and from the possible standard filler (c), present in the vulcanisable elastomeric composition according to the invention is at least 20 phr, more preferably at least 30 phr.

Preferably, the overall quantity of reinforcing materials, coming from the solid master elastomeric composition (b) and from the possible standard filler (c), present in the vulcanisable elastomeric composition according to the invention is comprised between 20 phr and 120 phr, more preferably between 30 phr and 90 phr.

Preferably, the vulcanisable elastomeric composition for tyres according to the present invention comprises a standard reinforcing filler (c) in a quantity lower than 110 phr, lower than 90 phr, lower than 60 phr, or it does not comprise a standard reinforcing filler (c).

Advantageously, by incorporating the present fibres in solid master elastomeric composition form as single reinforcing material, one fully avoids moving powdery substances during preparation of the compounds for tyres.

The vulcanisable elastomeric composition according to the present invention comprises at least one vulcanising agent (d).

The vulcanising agent more advantageously used is sulphur, or alternatively molecules containing sulphur (sulphur donors), with accelerators, activators and/or retardants known to those skilled in the art.

Sulphur or its derivatives can be advantageously selected, for example, from among: (i) soluble sulphur (crystalline sulphur); (ii) insoluble sulphur (polymer sulphur); (iii) sulphur dispersed in oil (e.g. 33% sulphur known with the commercial name of Crystex OT33 by Eastman); (iv) sulphur donor such as caprolactam disulphide (CLD), bis[(trialkoxysilyl)propyl]polysulphides, dithiophosphates; and mixtures thereof.

The vulcanising agent (d) is present in the vulcanisable elastomeric composition of the invention in a quantity from 0.1 to 15 phr, preferably from 0.5 to 10 phr, even more preferably from 1 to 7 phr.

The vulcanisable elastomeric composition according to the present invention may also comprise at least one silane coupling agent (e) capable of interacting with the silicate fibres and the silica possibly present as reinforcing filler and of binding them to the diene elastomer polymer during vulcanisation.

Preferably the vulcanisable elastomeric composition comprises at least one coupling agent.

Preferably, the silane coupling agent (e) which can be used in the present invention is selected from among those having at least one hydrolysable silane group, which can be identified for example by the following general formula (I):

$$(R)_3Si—C_nH_{2n}—X \quad (I)$$

where the R groups, which can be identical or different, are selected from among: alkyl, alkoxy or aryloxy groups or from halogen atoms, on condition that at least one of the R groups is an alkoxy or aryloxy group or a halogen; n is an integer between 1 and 6 included; X is a group selected from among: nitrous, mercapto, amino, epoxide, vinyl, imide, chloro, —(S)$_m$C$_n$H$_{2n}$—Si—(R)$_3$ and —S—COR, where m and n are integers between 1 and 6 included and the R groups are defined as stated above. Among the silane coupling agents, those particularly preferred are bis(3-triethoxysilylpropyl) tetrasulphide and bis(3-triethoxysilylpropyl) disulphide. Said coupling agents can be used as is or as a suitable mixture with an inert filler (e.g. carbon black) so as to facilitate their incorporation in the vulcanisable elastomeric composition.

Preferably, said silane coupling agent (e) is present in the vulcanisable elastomeric composition in a quantity comprised between 0.1 phr and 20 phr, preferably between 0.5 phr and 10 phr.

Preferably the vulcanising agent (d) is used in combination with accelerants (f) and activators (g) known to those skilled in the art.

The accelerants (f) which are commonly used can be selected from among: dithiocarbamates, guanidine, thiourea, thiazoles, sulfenamides, thiurams, amines, xanthates and mixtures thereof.

Preferably the accelerants of vulcanisation are present in the vulcanisable elastomeric composition of the invention in a quantity from 0.1 to 8 phr, preferably from 0.3 to 6 phr.

The activators (g) which are particularly effective are composed of zinc and in particular ZnO, $ZnCO_3$, zinc salts of saturated or unsaturated fatty acids containing from 8 to 18 carbon atoms, such as zinc stearate, which are preferably formed in situ in the vulcanisable elastomeric composition by ZnO and fatty acid, as well as $Bi_2O_3$, PbO, $Pb_3O_4$, $PbO_2$, or mixtures thereof.

Preferably the activators of vulcanisation are present in the vulcanisable elastomeric composition of the invention in a quantity from 0.2 to 15 phr, preferably from 0.5 to 10 phr.

Finally, the above-described vulcanisable elastomeric materials can comprise other commonly used additives, selected on the basis of the specific application intended for the composition. For example, the following can be added to said materials: anti-oxidants, anti-aging agents, plasticising agents, adhesives, anti-ozone agents, modifying resins or mixtures thereof.

In particular, in order to further improve the workability, at least one plasticising agent can be added to said vulcanisable elastomeric composition, such plasticising agent generally selected from among mineral oils, vegetable oils, synthetic oils, low molecular weight polymers and mixtures thereof, such as aromatic oil, naphthenic oil, phthalates, soy oil and mixtures thereof. The quantity of plasticising agent is generally comprised between 0 phr and 70 phr, preferably between 5 phr and 30 phr.

The vulcanisable elastomeric compositions of the invention can be prepared by mixing the polymer components together with the solid master elastomeric composition and with the other possibly present additives according to the techniques known in the field. The mixing can for example be executed by using an open mixer of "open-mill" type or an internal mixer of the type with tangential rotors (Banbury®) or with penetrating rotors (Intermix), or in continuous mixers of Ko-Kneader™ (Buss®) type or of twin screw or multi-screw type.

The vulcanisable elastomeric composition according to the present invention is preferably used for manufacturing green or vulcanised tyre components for vehicle wheels.

The vulcanisable elastomeric composition of the invention can be vulcanised according to known techniques, due to the presence of sulphur-based vulcanisation systems commonly used for diene elastomer polymers. For this purpose, after one or more thermomechanical treatment stages, a preferably sulphur-based vulcanising agent is generally incorporated in the composition, preferably together with vulcanisation accelerants. In the final treatment step, the temperature is generally maintained lower than 120° C. and preferably lower than 100° C., so as to prevent any undesired pre-crosslinking phenomenon. Subsequently the vulcanisable composition is incorporated in one or more components of the tyre and subjected to vulcanisation, according to known techniques.

The tyre component according to the invention is preferably selected from among tread, underlayer, anti-abrasive elongated element, sidewall, sidewall insert, mini-sidewall, under-liner, rubber-covered layers, bead filler and sheet, more preferably tread, underlayer and sidewall insert.

At least one tyre component according to the invention, preferably selected from among tread, under-layer, anti-abrasive elongated element, sidewall, sidewall insert, a mini-sidewall, under-liner, rubber-covered layers, bead filler and sheet, is incorporated in a tyre for vehicle wheels.

Preferably, in the tyre according to the invention, at least the tread comprises said vulcanisable or vulcanised elastomeric composition comprising the solid master elastomeric composition according to the invention.

Preferably, in the tyre according to the invention, at least the tread and at least one component selected from among under-layer, anti-abrasive elongated element, sidewall, sidewall insert, mini-sidewall, under-liner, rubber-covered layers, bead filler and sheet comprise said vulcanisable or vulcanised elastomeric composition.

One embodiment according to the present invention regards a tyre for vehicles, preferably a high performance tyre (HP, SUV and UHP), comprising at least
one carcass structure comprising at least one carcass layer having opposite lateral edges associated with respective bead structures;
one belt structure applied in radially external position with respect to the carcass structure,
one tread band applied in radially external position with respect to said belt structure, and possibly at least
one under-layer and/or one anti-abrasive elongated element and/or one sidewall and/or sidewall insert and/or one mini-sidewall and/or one under-liner and/or one rubber-covered layer and/or one sheet,
wherein at least one from among said carcass structure and/or tread band and/or belt structure and/or under-layer and/or anti-abrasive elongated element and/or sidewall pair and/or sidewall insert and/or one mini-sidewall and/or under-liner and/or rubber-covered layer and/or bead structures and/or sheet comprises said above-described vulcanisable or vulcanised elastomeric composition.

Preferably, the tyre according to the invention comprises said vulcanisable or vulcanised elastomeric composition described above at least in the tread or in the under-layer or in the sidewall insert.

Preferably, the tyre according to the invention comprises said vulcanisable or vulcanised elastomeric composition described above in the tread and in one or more components selected from among under-layer, anti-abrasive elongated element, lunette, sidewall, sidewall insert, under-liner, rubber-covered layers, bead filler and sheet.

Preferably, the tyre according to the invention comprises the above-described vulcanised elastomeric material in the tread and in the under-layer.

Preferably, the tyre according to the invention comprises said above-described vulcanisable or vulcanised elastomeric composition in the tread and in the sidewall.

One embodiment according to the present invention is a tyre for vehicles, preferably for vehicles, whose driving performances are improved by an increase of the rigidity and a reduction of the hysteresis and of the Payne effect of the elastomeric material, such as high performance vehicles HP, SUV and UHP. The tyre according to the invention can be used on vehicles with two or four wheels, or on heavy vehicles, or on light transport vehicles.

The tyre according to the invention can be for summer or winter use or for all seasons.

The tyre according to the present invention can be manufactured according to a process which comprises:
forming components of a green tyre on at least one forming drum;
shaping, moulding and vulcanising the tyre;
wherein forming at least one of the green tyre components comprises:
making at least one green component comprising the vulcanisable elastomeric composition as previously described.

The term "green" is generally employed for indicating a material, a composition, a component or a tyre that is not yet vulcanised.

EMBODIMENTS OF THE INVENTION

The description of several embodiments of the invention, provided only as a non-limiting example, is set forth hereinbelow.

Figure 1:
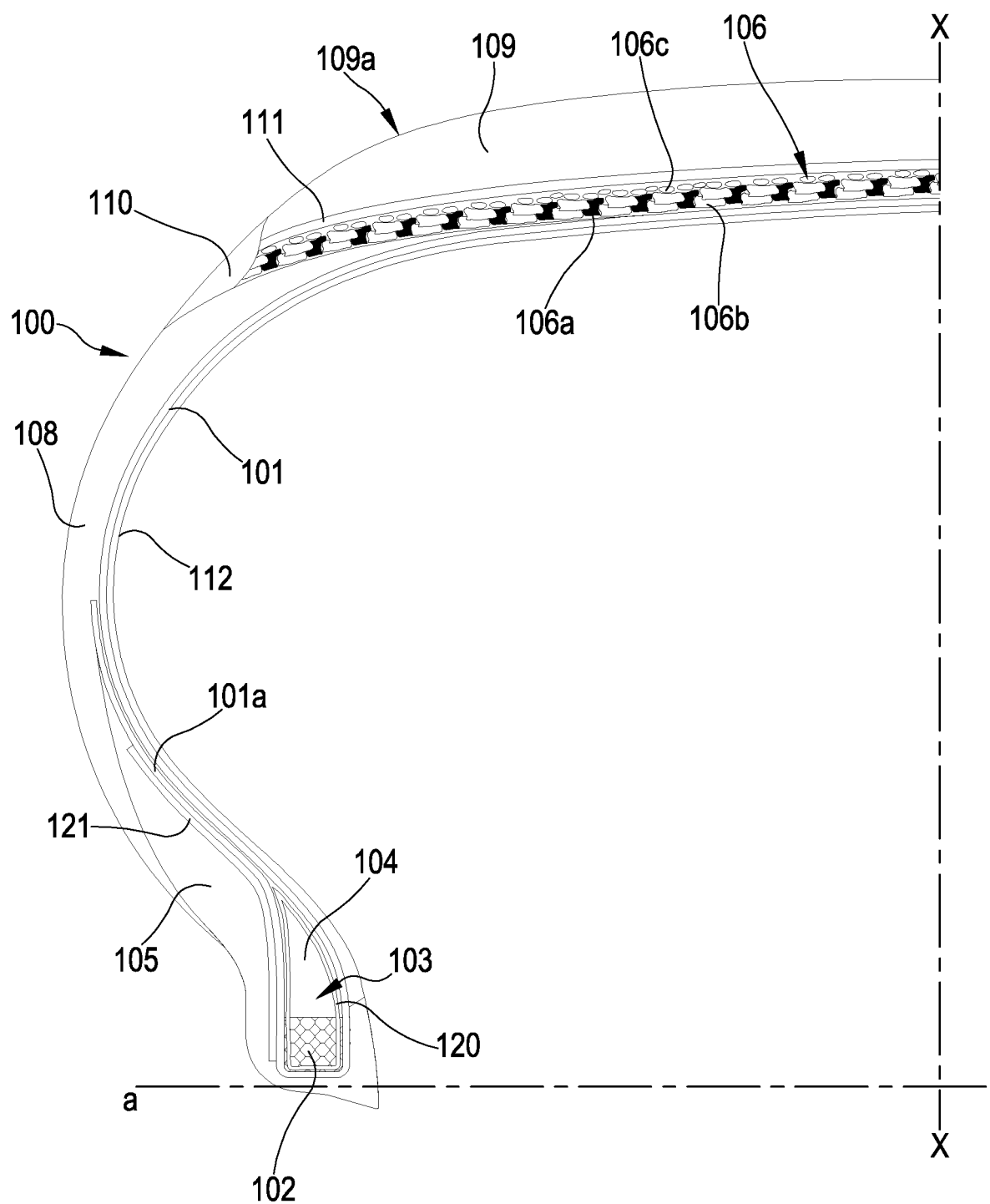
FIG. 1 is the representation of a tyre for cars comprising one or more components according to the invention.

FIG. 1 illustrates, in radial half-section, a tyre for vehicle wheels.

In FIG. 1, "a" indicates an axial direction and "X" indicates a radial direction, in particular with X-X the trace of the equatorial plane is indicated. For the sake of simplicity, FIG. 1 only shows one portion of the tyre, the remaining portion not represented since it is identical and arranged symmetrically with respect to the equatorial plane "X-X".

The tyre 100 for four-wheel vehicles comprises at least one carcass structure, comprising at least one carcass layer 101 having respectively opposite end flaps engaged with respective anchoring annular structures 102, termed bead cores, possibly associated with a bead filler 104.

The carcass layer 101 is possibly made with an elastomeric composition.

The zone of the tyre comprising the bead core 102 and the filler 104 forms a bead structure 103 intended for anchoring the tyre on a corresponding mounting rim, not illustrated.

The carcass structure is usually of radial type, i.e. the reinforcing elements of the at least one carcass layer 101 are situated on planes comprising the rotation axis of the tyre and substantially perpendicular to the equatorial plane of the tyre. Said reinforcing elements are generally constituted by textile cords, for example rayon, nylon, polyester (e.g. polyethylene naphthalate (PEN)). Each bead structure is associated with the carcass structure by means of folding backward the opposite lateral edges of the at least one carcass layer 101 around the anchoring annular structure 102 so as to form the so-called turn-ups of the carcass 101a as illustrated in FIG. 1.

In one embodiment, the coupling between the carcass structure and the bead structure can be provided by means of a second carcass layer (not shown in FIG. 1) applied in an axially external position with respect to the first carcass layer.

An anti-abrasive layer 105 possibly made with elastomeric composition is arranged in an external position of each bead structure 103.

The carcass structure is associated with a belt structure 106 comprising one or more belt layers 106a, 106b situated in radial superimposition with respect to each other and with respect to the carcass layer, having typically textile and/or metallic reinforcement cords incorporated in a layer of vulcanised elastomeric material.

Such reinforcing cords can have cross orientation with respect to a circumferential extension direction of the tyre 100. By "circumferential" direction it is intended a direction generically directed according to the rotation direction of the tyre.

In radially external position with respect to the belt layers 106a, 106b, at least one zero degree reinforcement layer 106c, commonly known as "0° belt", can be applied which generally incorporates a plurality of elongated reinforcement elements, typically textile or metallic cords, oriented in a substantially circumferential direction, thus forming an angle of only a few degrees (e.g. an angle between about 0° and 6°) with respect to a direction parallel to the equatorial plane of the tyre, and covered with vulcanised elastomeric material.

In radially external position with respect to the belt structure 106, a tread band 109 made of vulcanised elastomeric material is applied.

Respective sidewalls 108 made of vulcanised elastomeric material are also applied in axially external position on the lateral surfaces of the carcass structure, each extended from one of the lateral edges of the tread 109 up to the respective bead structure 103.

In radially external position, the tread band 109 has rolling surface 109a intended to come into contact with the ground. Circumferential grooves, which are connected by transverse notches (not shown in FIG. 1) so as to define a plurality of blocks of various shapes and sizes distributed on the rolling surface 109a, are generally made in this surface 109a, which is represented smooth for the sake of simplicity in FIG. 1.

An under-layer 111 made of vulcanised elastomeric material can be arranged between the belt structure 106 and the tread band 109.

A strip consisting of elastomeric composition 110, commonly known as "mini-sidewall", made of vulcanised elastomeric material may be present in the zone of connection between the sidewalls 108 and the tread band 109, this mini-sidewall generally being obtained by means of co-extrusion with the tread band 109 and allowing an improvement of the mechanical interaction between the tread band 109 and the sidewalls 108. Preferably the end portion of the sidewall 108 directly covers the lateral edge of the tread band 109.

In the case of tyres without air chamber, a rubber layer 112, generally known as "liner", which provides the necessary impermeability to the inflation air of the tyre, can also be provided in a radially internal position with respect to the carcass layer 101.

The rigidity of the tyre sidewall 108 can be improved by equipping the bead structure 103 with a reinforcing layer 120 generally known as "flipper" or additional strip-like insert.

The flipper 120 is a reinforcing layer that is wound around the respective bead core 102 and the bead filler 104 so as to at least partially surround them, said reinforcing layer being arranged between the at least one carcass layer 101 and the bead structure 103. Usually, the flipper is in contact with said at least one carcass layer 101 and said bead structure 103.

The flipper 120 typically comprises a plurality of textile cords incorporated in a layer of vulcanised elastomeric material.

The tyre bead structure 103 can comprise a further protection layer that is generally known with the term "chafer" 121 or protection strip and which has the function of increasing rigidity and integrity of the bead structure 103.

The chafer 121 usually comprises a plurality of cords incorporated in a rubber-covered layer made of vulcanised elastomeric material. Such cords are generally made of textile materials (e.g. aramid or rayon) or of metallic materials (e.g. steel cords).

A layer or sheet of elastomeric material can be arranged between the belt structure and the carcass structure (not shown in FIG. 1). The layer can have uniform thickness. Alternatively, the layer can have a variable thickness in axial direction.

For example, the layer can have a greater thickness close to its axially external edges with respect to the central (crown) zone.

Advantageously the layer or sheet can be extended on a surface substantially corresponding to the extension surface of said belt structure.

In a preferred embodiment, a layer or sheet of elastomeric material as described above can be placed between said belt structure and said tread band, said supplementary layer or sheet preferably being extended over a surface substantially corresponding to the extension surface of said belt structure.

The vulcanisable elastomeric composition according to the present invention can be advantageously incorporated in one or more of the components of the tyre selected from among belt structure, carcass structure, tread band, under-layer, sidewall, mini-sidewall, sidewall insert, bead, flipper, chafer, sheet and anti-abrasive strip.

The vulcanisable elastomeric composition according to the present invention can comprise at least (a) 100 phr of at least one diene elastomer
(b) 10 to 200 phr of a solid master elastomeric composition in accordance with the invention,
(c) 0 to 120 phr of a standard reinforcing filler,
(d) 0.1 to 15 phr of a vulcanising agent, and
(e) 0.1 to 20 phr of a coupling agent.

According to a non-illustrated embodiment, the tyre can be a tyre for motorcycle wheels which is typically a tyre which has a cross section marked by a high transverse curvature.

According to a non-illustrated embodiment, the tyre can be a tyre for heavy transport vehicle wheels, such as trucks, buses, trailers, vans and generally for vehicles in which the tyre is subjected to a high load. Preferably, one such tyre is adapted to be mounted on rims having diameter equal to or greater than 17.5 inches for directional or trailer wheels.

Analytical Methods

Thermogravimetric Analysis (TGA)

The determination of the profile of the weight loss was carried out with the apparatus Mettler Toledo TGA/DSC1 Star-e System, in a temperature range from 150 to 800° C. The measurements were carried out by using a temperature program which provides for an inert gas phase (ramp from 25 to 150° C. and a plateau at 150° C. in nitrogen flow) and an oxidation phase (ramp from 150 to 800° C. in dry air flow).

Preparation of Comparative Elastomeric Solid Master Compositions (Comparative MB)

The comparative compositions of Examples 1-2 were prepared, comprising carbon black instead of sepiolite or comprising organically modified sepiolite on the surface but using process conditions different from those of the process according to the invention.

EXAMPLE 1

Comparative

Preparation of MB1 Comprising Carbon Black in Rubber Latex (Without and In the Presence of Acids)

Experiments were conducted with different ratio between carbon black and rubber latex in simple apparatuses and according to the following general batch procedure. A suspension of carbon black N234 in water was prepared with a homogenisator (Silverson L5MHomogenisator, 5 minutes at 5000 rpm). The suspension thus prepared was mixed with 200 ml of 30% solid rubber latex (60 g), prepared by diluting 100 ml of Centex FA latex (60% solid content by weight equal to 120 g of solid, pH from 9 to 11, density 0.95 g/cm$^3$) with 100 ml of water. After 20 minutes of stirring at 300 rpm, the coagulated material was collected, it was washed with 3×100 ml of water and dried in an oven at 80° C. for 12 hours, obtaining dry MB. A sample of MB was subjected to thermogravimetric analysis (TGA) according to the previously described procedure, and based on the thermograph, the actual content of carbon black therein was obtained.

The quantities of the reagents used, the theoretical as well as the experimental values relative to the MB1 of the various experiments, are reported in the following Table 1:

TABLE 1

| Ex. | [1]CB g | [2]water g | [3]Tot. vol. ml | [4]Tot. vol./CB ml/g | [5]CB/solid w/w | Theoretical weight MB1 g | Actual weight MB1 g | Yield % MB1 % ww | [6]theoretical CB in MB1 Phr | [7]actual CB in MB1 phr |
|---|---|---|---|---|---|---|---|---|---|---|
| 1a | 12 | 120 | 320 | 27 | 0.2 | 72 | 32.4 | 45% | 20 | 32.5 |
| 1b | 18 | 180 | 380 | 21 | 0.3 | 78 | 49.2 | 63% | 30 | 35 |
| 1c | 24 | 240 | 440 | 18.3 | 0.4 | 84 | 63.1 | 75% | 40 | 39 |

Key:

Volume of latex: 200 ml;

solid content of the latex: 60 g.

[1]CB: carbon black;

[2]quantity of water for suspending CB;

[3]total volume of the final suspension obtained by mixing the suspension of CB with the latex;

[4]ratio between the total volume of the suspension 3 and the weight of CB;

[5]ratio between weight of CB and weight of solid contained in the latex;

[6]theoretical CB content in the MB1;

[7]actual CB content in the MB1 determined by TGA.

From the results reported in Table 1, it can be observed that with quantity of carbon black equal to a theoretical content of 20 and 30 phr in the MB (Examples 1a and 1b), only partial coagulation of the latex was obtained, as underlined by the low yields in MB 45% and 63%, respectively. In addition, the coagulated material was enriched in carbon black, with an actual content of carbon black determined with the TGA analysis greater than the theoretical, 32.5 vs. 20 and 35 vs. 30 phr.

The best results were obtained in the example 1c, in which the actual quantity of carbon black incorporated in the MB substantially corresponds to the theoretical, even if the yield in MB is quite far from being quantitative (75%).

In conclusion, from the tests conducted, it appears that it is not possible to obtain concentrated MB with good yield, by simple mixing of suspensions of carbon black and rubber lattices, given the tendency of the carbon black—latex aqueous mixture to spontaneously and incompletely coagulate.

Repeating the experiments using acids or other coagulant agents in batch procedures, it was not possible to obtain uniform MB with complete coagulation, comprising more than 40 phr of black.

EXAMPLE 2

Comparative

Preparation of MB2 Comprising Modified Sepiolite Fibres in Rubber Latex (Without and In the Presence of Acids)

Experiments were conducted at different ratio between organically modified sepiolite fibres (Pangel B5 by Tolsa) and rubber latex in simple apparatuses and according to the following general batch procedure.

A suspension of Pangel B5 in water was prepared, under magnetic stirring for 30 minutes (suspension A) and this was added to 80 ml of 15% solid rubber latex, containing 12 g of solid, prepared by diluting 20 g of 60% solid rubber latex HA with 60 g of water (B). After 10 minutes of magnetic stirring, the coagulated material was collected, it was washed with 3×100 ml of water up to neutrality and it was dried in an oven at 50° C. for 20 hours, obtaining dry MB2.

A sample of MB2 was subjected to thermogravimetric analysis (TGA) according to the previously described procedure, and based on the thermogram the actual content of PangelB5 in the same was determined.

The quantities of the used reagents, the theoretical as well as the experimental values relative to the MB1 of the various experiments, are reported in the following Table 2:

TABLE 2

| Ex. | [1]fibres g | [2]water g | [3]Tot. vol. ml | [4]Tot. vol./ fibres ml/g | [5]fibres/ solid w/w g/g | Theoretical weight MB2 g | Actual weight MB2 g | Yield % MB2 ww % | [6]theoretical fibres MB2 phr | [7]actual fibres MB2 phr |
|---|---|---|---|---|---|---|---|---|---|---|
| 2a | 0.3 | 10 | 90 | 300 | 0.025 | 12.3 | [8]no | [8]no | 2.5 | [8]no |
| 2b | 0.6 | 20 | 100 | 167 | 0.05 | 12.6 | 2.4 | 19% | 5 | 33 |
| 2c | 1.2 | 40 | 120 | 100 | 0.1 | 13.2 | 4.2 | 32% | 10 | 40 |
| 2d | 2.4 | 80 | 160 | 67 | 0.2 | 14.4 | 6.4 | 44% | 20 | 60 |

Key:
Volume of latex: 80 ml containing 12 g of solid;
[1]fibres: Pangel B5, organically modified sepiolite;
[2]quantity of water for suspending PNB5;
[3]total volume of the final suspension obtained by mixing the suspension of the fibres with the latex;
[4]ratio between the total volume of the suspension 3 and the fibre weight;
[5]ratio between fibre weight and weight of solid contained in the latex;
[6]theoretical fibre content in the MB2;
[7]actual fibre content in the MB2 determined by TGA;
[8]no (Ex. 2a) indicates that there was no formation of coagulation.

From the results reported in Table 2 and from the observation of the Applicant, it is indicated that, without acids, there is no coagulation formation with quantities of Pangel B5 corresponding to 2.5 phr. At 5 phr, the quick coagulation started of a part of the material but in none of the tests was it possible to make the entire solid of the latex coagulate, as shown by the yields % MB lower than 50% in relation to the theoretical and by the lactescent aspect of the supernatant.

From the TGA analyses carried out on the coagulations, it was seen that they were enriched in Pangel B5 beyond the theoretical (see column 7, actual fibre content in MB determined by TGA), consistent with the fact that not all of the rubber of the latex was coagulated.

Tests in the Presence of Acid

Other experiments were carried out, by repeating the tests 2a-2d but adding sulphuric acid (2% by weight aqueous solution) to the mixture of rubber latex and Pangel B5 up to a pH between 4 and 5. With the addition of acid, a complete coagulation is obtained, but it was visibly evident that the coagulant was not uniform since the material part that coagulated initially was darker.

In conclusion, by operating with low fibre/solid ratios in the latex, both in the absence and in the presence of acid, it was not possible to obtain elastomeric compositions of uniform composition and with quantitative yields.

EXAMPLE 3

Invention

Preparation of MB3 Comprising Organically Modified Sepiolite Fibres (Pangel B5) Further Modified with Acid
Preparation of Modified Fibres The organically modified sepiolite Pangel B5 was further modified with acid treatment according to the following procedure: 120 g of fibres (Pangel B5) were suspended in 1200 ml of isopropanol at 65° C. under stirring. 480 ml of 37% HCl in water were added to the suspension, it was stirred at 600 rpm for 2 h at 65° C., it was then filtered and washed exhaustively with deionised water up to pH 6.6-7.4 and finally it was dried in an oven at 120° C. for 48 h.
Incorporation of the Modified Fibres in the MB3

10 g of this sepiolite Pangel B5 modified with acid treatment were suspended in 200 g deionised water, stirred for 10 min. at 500 rpm, sonicated for 10 minutes in a laboratory ultrasound bath and finally further stirred for 5 min. to yield a uniform suspension (A).

The suspension A was added to 23.8 g of latex Von Bundit MA (containing 60% solid), equal to 14.3 g of solid (B), and the mixture (C) kept at 300 rpm, observing a nearly immediate coagulation.

The mixture was kept under stirring at 300 rpm for 5 minutes.

The coagulate was collected, washed with 3×100 ml of water and dried in an oven at 80° C. for 12 h, obtaining 21.3 g of master composition (MB3) (88% yield).

The quantities of the used reagents, the theoretical as well as the experimental values relative to the MB3, are reported in the following Table 3:

TABLE 3

| Ex. | [1]fibres g | [2]water g | [3]Tot. vol. ml | [4]Tot. vol./ fibres ml/g | [5]fibres/ solid/ w/w g/g | Theoretical weight MB3 g | Actual weight MB3 g | Yield % MB3 % ww | [6]theoretical fibres MB3 phr | [7]actual fibres MB3 phr |
|---|---|---|---|---|---|---|---|---|---|---|
| 3 | 10 | 200 | 224 | 22.4 | 0.7 | 24.3 | 21.3 | 88% | 70 | 74 |

Key:
Quantity of latex: 23.8 g;
solid content of the latex: 14.3 g;
[1]fibres: Pangel B5 modified with acids;
[2]quantity of water for suspending the fibres;
[3]total volume of the final suspension obtained by mixing the suspension of the fibres with the latex;
[4]ratio between the total volume of the suspension 3 and the fibre weight;
[5]ratio between fibre weight and weight of solid contained in the latex;
[6]theoretical fibre content in the MB3;
[7]actual fibre content in the MB3 determined by TGA.

As can be observed from the table values, by using a high ratio between fibres and solid contained in the latex (around 0.70) it was possible to obtain the MB3 with good yields and with a fibre content in line with the theoretical.

EXAMPLE 4

Invention

Preparation of MB4 Comprising Sepiolite Fibres (Pangel S9) Modified with Acid and Silanised
Preparation of Modified Fibres 120 g of sepiolite fibres Pangel S9 were suspended in 1200 ml isopropanol at 65° C. under stirring. 480 ml 37% HCl in water and 64.7 g of Bis[3-(triethoxysilyl)propyl] tetrasulphide (TESPT) were added to the suspension, it was stirred at 600 rpm for 2 h at 65° C., it was then filtered and exhaustively washed with deionised water up to pH 6.6-7.4 and finally it was dried in an oven at 120° C. for 48 h.
Incorporation of the Modified Fibres in the MB4

10 g of fibres as modified above were suspended in 200 ml of deionised water, stirred for 10 min. at 500 rpm, sonicated for 10 minutes (laboratory ultrasound bath), stirred for another 5 min. to yield a uniform suspension (A).

The suspension A was added to 12.8 g of latex Von Bundit MA (B) containing 60% solid, equal to 7.7 g of solid, and maintained under stirring at 300 rpm for 3 minutes, observing a nearly immediate coagulation. The mixture was held under stirring at 300 rpm for another 5 minutes.

The coagulate was collected, washed with 2×100 ml of water and dried in an oven at 80° C. for 12 h, obtaining 16.8 g of composition MB4 (95% yield, with an actual fibre content equal to 130.3 phr determined by TGA).

The quantities of the used reagents, the theoretical as well as the experimental values relative to the MB4, are reported in the following Table 4:

TABLE 4

| Ex. | $^1$fibres g | $^2$water g | $^3$Tot. vol. ml | $^4$Tot. vol./ fibres ml/g | $^5$fibres solid/ w/w g/g | Theoretical weight MB4 g | Actual weight MB4 g | Yield % MB4 % ww | $^6$theoretical fibres MB4 phr | $^7$actual fibres MB4 phr |
|---|---|---|---|---|---|---|---|---|---|---|
| 4 | 10 | 200 | 213 | 21.3 | 1.3 | 17.7 | 16.8 | 95% | 130 | 130.3 |

Key:
Quantity of latex: 12.8 g;
solid content of the latex: 7.7 g;
$^1$sepiolite Pangel S9 modified with acids and silanised;
$^2$quantity of water for suspending the fibres;
$^3$total volume of the final suspension obtained by mixing the suspension of the fibres with the latex;
$^4$ratio between the total volume of the suspension 3 and the fibre weight;
$^5$ratio between fibre weight and weight of solid contained in the latex;
$^6$theoretical fibre content in the MB4;
$^7$actual fibre content in the MB4 determined by TGA.

As can be observed from the table values, by using a high ratio between fibres and solid contained in the latex (around 1.3) it was possible to obtain the MB4 with very good yields and with a fibre content in line with the theoretical.

EXAMPLE 5

Invention

Preparation of MB5 Comprising Organically Modified Sepiolite Fibres (Pangel B5)

10 g of organically modified sepiolite fibres with quaternary ammonium salt talloyl benzyl dimethyl ammonium chloride (commercial Pangel B5, batch 1) were suspended in 200 ml deionised water, stirred for 10 min. at 500 rpm, sonicated for 10 minutes (laboratory ultrasound bath) and stirred for another 5 min. to yield a uniform suspension (A).

The suspension A was added to 16.7 g of latex Von Bundit MA containing 60% solid, equal to 10 g of solid (B), and maintained at 300 rpm per 3 minutes, observing a nearly immediate coagulation. The mixture was kept under stirring at 300 rpm for another 5 minutes.

Figure 2:
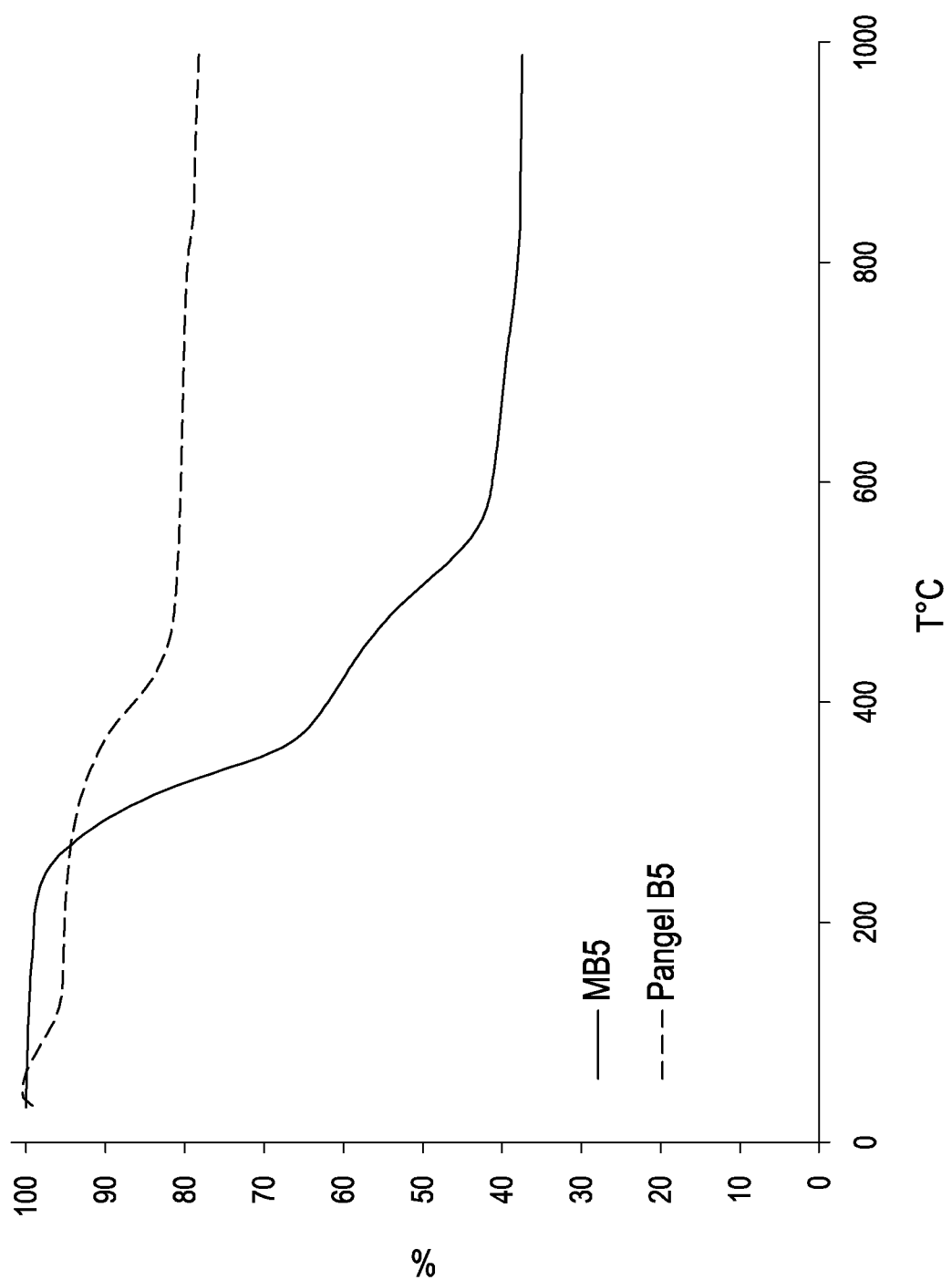
FIG. 2 is the thermogravimetric diagram (TGA) of commercial organically modified sepiolite fibres (Pangel B5) and of the MB according to the invention (MB5 Ex. 5) in which the percentage loss of weight is reported on the y-axis and the temperature in centigrades is reported on the x-axis, measured as described in the experimental part.

The coagulate was collected, washed with 3×100 ml of water and dried in an oven at 80° C. for 12 h, obtaining 19.1 g of composition MB5 (96% yield) with a fibre content equal to 97.5 phr determined by TGA (see in FIG. 2 the TGA trace of the fibres of Pangel B5 and of the masterbatch MB5 that incorporates them).

The quantities of the used reagents, the theoretical as well as the experimental values relative to the MB5, are reported in the following Table 5:

TABLE 5

| Ex. | $^1$fibres g | $^2$water g | $^3$Tot. vol. ml | $^4$Tot. vol./ fibres ml/g | $^5$fibres/ solid w/w g/g | Theoretical weight MB5 g | Actual weight MB5 g | Yield % MB5 % ww | $^6$theoretical fibres MB5 phr | $^7$actual fibres MB5 phr |
|---|---|---|---|---|---|---|---|---|---|---|
| 5 | 10 | 200 | 217 | 21.7 | 1 | 20.0 | 19.1 | 96% | 100 | 97.5 |

Key:
Quantity of latex: 16.7 g;
solid content of the latex: 10 g;
$^1$fibres: commercial Pangel B5;
$^2$quantity of water for suspending the fibres;
$^3$total volume of the final suspension obtained by mixing the suspension of the fibres with the latex;
$^4$ratio between the total volume of the suspension 3 and the fibre weight;
$^5$ratio between fibre weight and weight of solid contained in the latex;
$^6$theoretical fibre content in the MB5;
$^7$actual fibre content in the MB5 determined by TGA As can be observed from the table values, by using a high ratio between fibres and solid contained in the latex (around 1:1) it was possible to obtain the MB5 with very high yields and with a fibre content in line with the theoretical.

EXAMPLE 6

Invention

Preparation of MB6 Comprising Organically Modified Sepiolite Fibres (Pangel B5)

120 g of organically modified sepiolite fibres (commercial Pangel B5—batch 2) were suspended in 2000 ml of deionised water, stirred for 30 min. at 1000 rpm to yield a uniform suspension (A).

200 g of latex Centex FA (60% w/w solid content equal to 120 g of solid, pH from 9 to 11, density 0.95 g/cm$^3$) were mixed with 600 ml of water and stirred for 10 min. at 800 rpm to yield a (15% solid) suspension (B).

The suspension A was added to the suspension B stirred at 800 rpm in 3 minutes, observing nearly immediate coagulation. This suspension (C) was maintained under stirring at 500 rpm for another 5 minutes.

The coagulate was collected, washed with 4×300 ml of water and dried in an oven at 45° C. for 16 h, obtaining 236 g of composition MB6 (98.3% yield) with a fibre content equal to 99.7 phr determined by TGA.

The quantities of the used reagents, the theoretical as well as the experimental values relative to the MB6, are reported in the following Table 6:

TABLE 6

| Ex. | [1]fibres g | [2]water g | [3]Tot. vol. ml | [4]Tot. vol./ fibres ml/g | [5]fibres/ solid w/w g/g | Theoretical weight MB6 g | Actual weight MB6 g | Yield % MB6 % ww | [6]theoretical fibres MB6 phr | [7]actual fibres MB6 phr |
|---|---|---|---|---|---|---|---|---|---|---|
| 6 | 120 | 2000 | 2800 | 23.3 | 1 | 240 | 236 | 98.3% | 100 | 99.7 |

Key:
Quantity of latex: 200 g;
solid content of the latex: 120 g;
[1]fibres: commercial Pangel B5;
[2]quantity of water for suspending the fibres;
[3]total volume of the final suspension obtained by mixing the suspension of the fibres with the latex;
[4]ratio between the total volume of the suspension 3 and the fibre weight;
[5]ratio between fibre weight and weight of solid contained in the latex;
6theoretical fibre content in the MB6;
[7]actual fibre content in the MB6 determined by TGA As can be observed from the table values, by using a high ratio between fibres and solid contained in the latex (around 1:1) it was possible to obtain the MB6 with very high yields and with a fibre content in line with the theoretical.

EXAMPLE 7

Invention

Preparation of MB7 Comprising Organically Modified Sepiolite Fibres (Pangel B5) (Pilot Scale on 30 Kg of Fibres) (Inverse Addition)

30 kg of organically modified sepiolite fibres (commercial Pangel B5-batch 2) were suspended in 500 kg of deionised water in a reactor and stirred for 40 min. at 800 rpm to yield a uniform suspension (A).

50 kg of latex Von Bundit HA (60% w/v solid content, equal to 30 Kg of solid, pH from 9 to 11, density 0.95 g/cm$^3$) were diluted with 150 kg of water and stirred for 10 min. at 400 rpm to yield a suspension (B).

160 kg of suspension (B) were added in 10 minutes to the suspension (A) (inverse addition) maintained under stirring at 350 rpm. The stirring was then brought to 200 rpm and the remaining 40 Kg of suspension (B) were added in another 5 minutes. The suspension thus obtained (C) was maintained under stirring at 200 rpm for further 5 minutes, during which other 40 kg of water were added.

The coagulate was filtered, washed with about 1000 kg of water and dried in an oven at 95° C. for 16 h, obtaining 59 kg of composition MB7 (98% yield) with a fibre content equal to 101.3 phr determined by TGA.

The quantities of the used reagents, the theoretical as well as the experimental values relative to the MB7, are reported in the following Table 7:

TABLE 7

| Ex. | [1]fibres kg | [2]water kg | [3]Tot. vol. l | [4]Tot. vol./ fibres l/kg | [5]fibres/ solid w/w Kg/Kg | Theoretical weight MB7 Kg | Actual weight MB7 Kg | Yield % MB7 % ww | [6]theoretical fibres MB7 phr | [7]actual fibres MB7 phr |
|---|---|---|---|---|---|---|---|---|---|---|
| 7 | 30 | 500 | 740 | 24.7 | 1 | 60 | 59 | 98% | 100 | 101.3 |

Key:
Quantity of latex: 50 Kg;
solid content of the latex: 30 Kg;
[1]fibres: commercial Pangel B5;
[2]quantity of water for suspending the fibres;
[3]total volume of the final suspension obtained by mixing the suspension of the fibres with the latex;
[4]ratio between the total volume of the suspension 3 and the fibre weight;
[5]ratio between fibre weight and weight of solid contained in the latex;
[6]theoretical fibre content in the MB7;
[7]actual fibre content in the MB7 determined by TGA.

As can be observed from the table values, by using a high ratio between fibres and solid contained in the latex (around 1) it was possible to obtain—on industrial scale—the MB7 with very high yields and with a fibre content in line with the theoretical. This MB, unlike that obtained via direct addition, appeared particularly fine.

Thermogravimetric Analysis

In the following Tables 8 and 9, the results of the thermogravimetric analyses are reported, such analyses respectively conducted on the fibres and on the compositions that incorporate them:

TABLE 8

| Fibres | TGA residual % |
|---|---|
| i) Pangel B5 modified with acid | 75.67 |
| ii) Pangel S9 (sepiolite) modified with acid and silanised with TESPT | 72.46 |
| iii) commercial Pangel B5 - batch 1 | 77.99 |
| iv) commercial Pangel B5 - batch 2 | 76.50 |

TABLE 9

| Ex. | Composition (MB) | Fibres | TGA residual % |
|---|---|---|---|
| 3 | MB3 | i) | 32.2 |
| 4 | MB4 | ii) | 41.0 |
| 5 | MB5 | iii) | 38.5 |

TABLE 9-continued

| Ex. | Composition (MB) | Fibres | TGA residual % |
|---|---|---|---|
| 6 | MB6 | iv) | 38.2 |
| 7 | MB7 | iv) | 38.5 |

The following summary Table 10 reports the important data relative to all the MB prepared according to the invention:

TABLE 10

| Ex. | fibres | fibres [g] | $^2$water [g] | 60% solid latex NR [g] | $^3$water [g] | actual weight MB [g] | yield % MB [%] | theoretical fibres MB phr | actual fibres MB (TGA) phr | fibres in 100 g MB | rubber in 100 g MB |
|---|---|---|---|---|---|---|---|---|---|---|---|
| 3 | i) | 10 | 200 | 23.8 | 0 | 21.3 | 88% | 70 | 74 | 42.5 | 57.5 |
| 4 | ii) | 10 | 200 | 12.8 | 0 | 16.8 | 95% | 130 | 130.3 | 56.6 | 43.4 |
| 5 | iii) | 10 | 200 | 16.7 | 0 | 19.1 | 96% | 100 | 97.5 | 49.4 | 50.6 |
| 6 | iv) | 120 | 2000 | 200 | 600 | 236 | 98% | 100 | 99.7 | 49.9 | 50.1 |
| 7 | iv) | 30 $^4$ | 500 $^4$ | 50 $^4$ | 150 $^4$ | 59 $^4$ | 98% | 100 | 101.3 | 50.3 | 49.7 |

$^2$water for suspending the fibres;
$^3$water for diluting the latex;
$^4$ expressed in Kg

EXAMPLE 8

Preparation of Elastomeric Compositions for Tyres Comprising MB7 (Invention) or the Same Fibres Directly Incorporated in the Elastomers in Dry Powder Form (Comparative)

Specimens of vulcanised elastomeric materials were prepared in order to evaluate if the incorporation of the reinforcing fibres of the new MB of the invention involved a variation of the final properties of the materials themselves.

For such purpose, two elastomeric compositions were prepared for anti-abrasive elongated elements (8A invention and 8B comparative) with the ingredients reported in the following Table 11:

TABLE 11

| Components (phr) | Ex. 8A (Inv.) | Ex. 8B (Comp.) |
|---|---|---|
| NR | 54 | 70 |
| BR | 30 | 30 |
| MB7 Ex. 7 (PangelB5) | 32 | — |
| Stearic acid | 2 | 2 |
| TESPT Silane | 1 | 1 |
| ZNO | 3 | 3 |
| 6-PPD | 2.4 | 2.4 |
| CB | 45 | 45 |
| PANGEL B5 | — | 16 |
| TBBS | 1.4 | 1.4 |
| PVI | 0.3 | 0.3 |
| Sulphur | 2.76 | 2.76 | in which NR: Natural rubber with controlled viscosity CV 60 provided by Von Bundit (Thailand). BR(Nd): neodymium high-cis polybutadiene (Europrene 40 Versalis) TESPT Silane: Bis[3-(triethoxysilyl)propyl]Tetrasulphide on carbon black; CB: carbon black; Zeosil 1115 MP: precipitated synthetic amorphous silica (Rhodia); Pangel B5: organo-modified sepiolite by Tolsa; ZnO: zinc oxide; 6-PPD: N-(1,3-Dimethylbutyl)-N'-phenyl-p-phenylenediamine; TBBS: N-tert-butyl-2-benzothiazyl sulfenamide. Sulphur: S8 (soluble sulphur) by Zolfo industria.

MB7 is the composition prepared in Ex. 7; the 32 phr of MB7 comprise about 16 phr of fibres and 16 phr of rubber.

The elastomeric materials were prepared according to this general procedure:

The elastomers were loaded in an internal mixer (Brabender or Banbury)

The Pangel B5 fibres or the MB7 were added into the mixer and mixed for about 5 minutes.

Then the stearic acid, the 6PPD and the ZnO were added, continuing the mixing. As soon as the temperature reached 145° C.±5° C., the elastomeric material was unloaded.

The material from the preceding step was then inserted in an internal mixer (Brabender or Banbury), the vulcanising system was added and the mixing was carried out at 90° C. for 3 minutes. The vulcanisable composition was then unloaded and cooled under air.

EXAMPLE 9

Preparation of Elastomeric Compositions for Tyres Comprising MB7 (Invention) or the to Same Fibres Directly Incorporated in the Elastomers in Dry Powder Form (Comparative)

Specimens of vulcanised elastomeric materials were prepared in order to evaluate if the incorporation of the reinforcing fibres in the new MB of the invention involved a variation of the final properties of the materials themselves.

For such purpose, two elastomeric compositions for internal sidewall (9A invention and 9B comparative) were prepared with the ingredients reported in the following Table 12:

TABLE 12

| Components (phr) | Ex. 9A (Inv) | Ex. 9B (Comp.) |
|---|---|---|
| NR | 31.5 | 40 |
| BR | 60 | 60 |
| MB7 | 17 | — |
| Pangel B5 modified with acid (i) | — | 8.5 |
| CB N550 | 25 | 25 |
| ZEOSIL 1115 MP | 20 | 20 |
| Stearic acid | 1 | 1 |
| TESPT Silane | 5 | 5 |
| ZnO | 4 | 4 |
| 6-PPD | 1.5 | 1.5 |
| TBBS 80 | 4 | 4 |
| TMQ | 1 | 1 |
| Sulphur | 2.3 | 2.3 | in which: NR: Natural rubber with controlled viscosity CV 60 provided by Von Bundit (Thailand), BR(Nd): neodymium high-cis polybutadiene (Europrene 40 Versalis); silane: 50% TESPT: Bis[3-(triethoxysilyl)propyl]Tetrasulphide on carbon black; CB: carbon black; Zeosil 1115 MP: precipitated synthetic amorphous silica (Rhodia); ZnO: zinc oxide; TMQ: polymerized 2,2,4-trimethyl-1,2-dihydroquinoline; 6-PPD: N-(1,3-Dimethylbutyl)-N'-phenyl-p-phenylenediamine; TBBS: N-tert-butyl-2-benzothiazyl sulfenamide; Sulphur: S8 (soluble sulphur) by Zolfo industria MB7 is the composition prepared in Ex. 7; the 17 phr of MB7 comprise about 8.5 phr of fibres and 8.5 phr of rubber)

Evaluation of the Properties of the Elastomeric Materials

Properties of the Non-Vulcanised Materials

The vulcanisable elastomeric materials (green) of Examples 8a, 8b, 9a and 9b were subjected to the following evaluations:

Rheometric analysis MDR (according to the standard ISO 6502): a rheometer Alpha Technologies of type MDR2000 was used. The tests were carried out at 170° C. for 20 minutes, at an oscillation frequency of 1.66 Hz (100 oscillations minute) and an oscillation amplitude of ±0.5°, measuring the time necessary for attaining an increase of two rheometric units (TS2) and the time necessary for reaching respectively 60% (T60), and 90% (T90) of the final torque value (Mf). The value of maximum torque MH and the value of minimum torque ML were measured.

Mooney ML (1+4) viscosity at 100° C.: was measured, according to the standard ISO 289-1:2005

Properties of the Vulcanised Materials

The elastomeric materials prepared in the preceding examples were vulcanised to yield specimens on which the analytical characterisations and the evaluation of the static and dynamic mechanical properties were carried out.

The vulcanisation, if not otherwise indicated, was conducted in a mould, in a hydraulic press at 170° C. and at the pressure of 200 bar for a time of about 10 minutes.

The static mechanical properties were measured at 23° C. according to the standard ISO 37:2005.

In particular the load at different elongation levels (50%, 100% and 300%, termed CA0.5, CA1 and CA3) and the rupture load CR were measured on specimens of the abovementioned elastomeric materials.

The tensile tests were carried out on specimens with rectilinear axis of Dumbbell type.

The dynamic mechanical properties were measured by using a dynamic device, Instron, in compression-tensile mode according to the following methods.

A vulcanised specimen of the elastomeric materials of Examples 8a and 8b having a cylindrical shape (length=25 mm; diameter=14 mm), subjected to pre-load compression up to 25% of the longitudinal deformation in relation to the initial length and maintained at the predetermined temperature (equal to −10° C., 0° C., +23° C. or +70° C.) for the entire duration of the test, was subjected to a dynamic sinusoidal tension having an amplitude of ±3.5% in relation to the length under pre-load, with a frequency of 100 Hz.

The dynamic shear mechanical properties were evaluated for the specimens of Examples 8a and 8b by using a rheometer Monsanto R.P.A. 2000 according to the to following method: cylindrical test specimens with weights from 4.5 g to 5.5 g were obtained by means of punching from the vulcanisable elastomeric composition under examination.

These specimens were vulcanised in the instrument "RPA" at 170° C. for 10 minutes or 15 minutes depending on the kinetics of vulcanisation, and they were subjected to the measurement of the dynamic shear elastic modulus (G') at 70° C., frequency 10 Hz, deformation between 0.1% and 10%, and of Tan delta (hysteresis or dissipation factor), calculated as the ratio between the viscous modulus (G") and the elastic modulus (G') measured in the same conditions (70° C., 10 Hz).

The Payne effect was evaluated in absolute terms through the difference between the moduli (G') at 10% and at 0.5%, and in relative terms such as the percentage variation between 10% and 0.5% in relation to the modulus value G' at 9%.

The following Tables 13 and 14 report the results of the above-described analyses conducted on those specimens.

TABLE 13

|  | Ex. 8a (Inv.) | Ex. 8b (Comp.) |
| --- | --- | --- |
| Properties of green materials (MDR) | | |
| Viscosity ML 100° C. | 70 | 68 |
| ML [dN m] | 2.27 | 2.04 |
| MH [dN m] | 24.20 | 24.59 |
| Properties of vulcanised materials | | |
| CA0.5 [MPa] | 3.65 | 3.85 |
| CA1 [MPa] | 7.22 | 7.41 |
| CA3 [MPa] | 19.32 | 19.21 |
| CR [MPa] | 20.2 | 20.4 |
| AR [%] | 318.7 | 316.3 |
| E' 23° C. 10 Hz [MPa] | 12.74 | 13.31 |
| E' 70° C. 10 Hz [MPa] | 10.55 | 10.89 |
| Tan Delta 23° C. 10Hz | 0.174 | 0.167 |
| Tan Delta 70° C. 10 Hz | 0.127 | 0.119 |
| RPA 10'/170° C. | | |
| G' 70° C. (9%) [MPa] | 1.77 | 1.70 |
| Tan Delta 70° C. (9%) | 0.204 | 0.208 |
| dG' (0.5-10) [MPa] | 3.2 | 3.0 |

TABLE 14

|  | Ex. 9a (Inv.) | Ex. 9b (Comp.) |
| --- | --- | --- |
| Properties of green materials (MDR) | | |
| Viscosity ML 100° C. | 72 | 73 |
| ML [dN m] | 2.34 | 2.36 |
| MH [dN m] | 27.59 | 27.71 |
| Properties of vulcanised materials | | |
| CA1 [MPa] | 2.68 | 2.46 |
| CA3 [MPa] | 6.05 | 5.47 |
| CR [MPa] | 10.31 | 8.56 |
| AR [%] | 165.3 | 153.5 |
| RPA 10'/170° C. | | |
| G' 70° C. (9%) [MPa] | 1.75 | 1.71 |
| Tan Delta 70° C. (9%) | 0.088 | 0.082 |
| dG' (0.5-10) [MPa] | 1.0 | 0.9 |

As can be reserved from the data reported in tables 13 and 14, the properties of the materials—whether green or vulcanised—are substantially comparable.

Upon optical microscope observation of specimens of the compositions of Ex. 9A and 9B—compositions comprising both carbon black (N550) and white fillers (silica and modified fibres), the latter introduced as MB or in powder form, respectively—the fillers appeared dispersed in the elastomeric material in a comparable manner.

Therefore, the master compositions (MB) of the invention can be used for incorporating the reinforcing fibres in the elastomeric compositions for tyres without altering the performances thereof but with undoubted advantages regarding the handling of the powders.

Indeed, the preparation of the master compositions via incorporation of the fibres in the lattices according to the invention advantageously allows minimising their dispersion in the environment, unlike what occurs in the conventional approach of introduction of the powders during the standard mixing with solid rubbers in a Banbury mixer or in an extruder.

In the process according to the invention, materials can in fact be used in the form of non-powdery wet cakes, coming from the preparation or derivatisation in aqueous environment of the fibres themselves, also eliminating the high energy step of drying. In addition, even using dried powders, in the present process it is possible to advantageously employ specific measures for reducing the powders, such as the water nebulisation, measures that are not applicable to the conventional procedures of powder mixing with solid rubber, carried out in mixers of Banbury type or in an extruder.

The invention claimed is:

1. A process for preparing a solid master elastomeric composition, comprising silicate fibres of nanometric size with needle-shaped morphology and one or more diene elastomers, comprising:
   providing the fibres and an elastomeric latex comprising one or more diene elastomers and an aqueous phase, wherein a weight ratio of the fibres to the diene elastomer present in the latex is at least 0.5:1,
   combining the fibres and the latex to yield an aqueous suspension,
   bringing the pH of the aqueous suspension to, or maintaining the pH of the aqueous suspension within, a range from 7.5 to 12.0,
   bringing a volumetric ratio between the total volume of the aqueous suspension and the weight of the fibres to, or maintaining the volumetric ratio within, a range from 10:1 to 30:1 ml/g, to yield a final suspension (C),
   allowing the elastomeric composition to precipitate out of the final suspension (C).

2. The process as claimed in claim 1, wherein the fibres are in a solid wet form or are suspended in water to yield an aqueous suspension (A) comprising from 10 to 100 g/l, or from 30 to 60 g/l of fibres in relation to water.

3. The process as claimed in claim 1, wherein the fibres are in a solid wet form and are suspended in water to yield an aqueous suspension (A) comprising from 10 to 100 g/l, or from 30 to 60 g/l of fibres in relation to water.

4. The process as claimed in claim 2, wherein combining the fibres and the latex comprises adding the aqueous suspension (A) to the latex (direct addition) or adding the latex to the aqueous suspension (A) (inverse addition).

5. The process as claimed in claim 1, wherein the latex is a natural latex or has a pH ranging from 8 to 12.

6. The process as claimed in claim 1, wherein the latex is a natural latex and has a pH ranging from 8 to 12.

7. The process as claimed in claim 5, wherein the latex is a natural latex comprising 10% to 60% by weight of the diene elastomer.

8. The process as claimed in claim 1, wherein the weight ratio of the fibres to the diene elastomer in the latex is chosen from a range of 0.5:1 to 1.5:1, 0.7:1 to 1.3:1, 0.9:1 to 1.1:1, or about 1:1.

9. The process as claimed in claim 1, wherein combining the fibres and the latex comprises stirring and mixing the fibres with the latex for a time ranging from about 5 to 30 minutes at a temperature ranging from 10 to 50° C., or 20 to 30° C.

10. The process as claimed in claim 1, wherein the volumetric ratio of the final suspension (C) is from 15:1 to 25:1 ml/g, or 20:1 to 25:1 ml/g, or the pH of the final suspension (C) is from 7.5 to 11.

11. The process as claimed in claim 1, wherein the volumetric ratio of the final suspension (C) is chosen from a range of 15:1 to 25:1 ml/g, or 20:1 to 25:1 ml/g, and the pH of the final suspension (C) is from a range of 7.5 to 11.

12. The process as claimed in claim 1, wherein the fibres have an aspect ratio of at least 2:1, at least 3:1, or at least 5:1; or are sepiolite fibres, modified sepiolite fibres, or mixtures thereof; or are present in an amount chosen from at least 60 phr, 70 phr, 80 phr, or 90 phr, or from 50 to 200 phr, 60 to 150 phr, or 80 to 120 phr, per 100 parts by weight of the diene elastomer.

13. The process as claimed in claim 1, wherein the fibres
   have an aspect ratio of at least 2:1, at least 3:1, or at least 5:1;
   are sepiolite fibres, modified sepiolite fibres, or mixtures thereof; and
   are present in an amount chosen from at least 60 phr, 70 phr, 80 phr, or 90 phr, or from 50 to 200 phr, 60 to 150 phr, or 80 to 120 phr, per 100 parts by weight of the diene elastomer.

14. A solid master elastomeric composition prepared by a process comprising:
   providing silicate fibres of nanometric size with needle-shaped morphology and an elastomeric latex comprising one or more diene elastomers and an aqueous phase, wherein a weight ratio of the fibres to the diene elastomer present in the latex is at least 0.5:1,
   combining the fibres and the latex to yield an aqueous suspension,
   bringing the pH of the aqueous suspension to, or maintaining the pH of the aqueous suspension within, a range from 7.5 to 12.0,
   bringing a volumetric ratio between the total volume of the aqueous suspension and the weight of the fibres to, or maintaining the volumetric ratio within, a range from 10:1 to 30:1 ml/g, to yield a final suspension (C),
   allowing the elastomeric composition to precipitate out of the final suspension (C).

15. The solid master elastomeric composition as claimed in claim 14, consisting of 100 phr of one or more diene elastomers and at least 50 phr of the fibres.

16. The solid master elastomeric composition as claimed in claim 14, wherein the fibres have an aspect ratio of at least 2:1, at least 3:1, or at least 5:1; or are sepiolite fibres, modified sepiolite fibres, or mixtures thereof; or are present in the process or in the elastomeric composition in an amount chosen from at least 60 phr, 70 phr, 80 phr, or 90 phr, or from 50 to 200 phr, 60 to 150 phr, or 80 to 120 phr, per 100 parts by weight of the diene elastomer.

17. The solid master elastomeric composition as claimed in claim 14, wherein the fibres
   have an aspect ratio of at least 2:1, at least 3:1, or at least 5:1;
   are sepiolite fibres, modified sepiolite fibres, or mixtures thereof; and
   are present in the process or in the elastomeric composition in an amount chosen from at least 60 phr, 70 phr, 80 phr, or 90 phr, or from 50 to 200 phr, 60 to 150 phr, or 80 to 120 phr, per 100 parts by weight of the diene elastomer.

18. A vulcanisable elastomeric composition for tyre components, comprising:
   (a) 100 phr of one or more diene elastomers;
   (b) from 10 to 200 phr of a solid master elastomeric composition prepared by a process comprising:
      providing silicate fibres of nanometric size with needle-shaped morphology and an elastomeric latex comprising one or more diene elastomers and an aqueous phase, wherein a weight ratio of the fibres to the diene elastomer present in the latex is at least 0.5:1, combining the fibres and the latex to yield an aqueous suspension, bringing the pH of the aqueous suspension to, or maintaining the pH of the aqueous suspension within, a range from 7.5 to 12.0, bringing a volumetric ratio between the total volume of the aqueous suspension and the weight of the fibres to, or maintaining the volumetric ratio within, a range from 10:1 to 30:1 ml/g, to yield a final suspension (C), allowing the elastomeric composition to precipitate out of the final suspension (C);

(c) from 0 to 120 phr of a standard reinforcing filler;
(d) from 0.1 to 15 phr of a vulcanising agent; and
(e) from 0.1 to 20 phr of a coupling agent.

19. A tyre component comprising a vulcanisable elastomeric composition comprising:

(a) 100 phr of one or more diene elastomers;
(b) from 10 to 200 phr of a solid master elastomeric composition prepared by a process comprising:

providing silicate fibres of nanometric size with needle-shaped morphology and an elastomeric latex comprising one or more diene elastomers and an aqueous phase, wherein a weight ratio of the fibres to the diene elastomer present in the latex is at least 0.5:1, combining the fibres and the latex to yield an aqueous suspension, bringing the pH of the aqueous suspension to, or maintaining the pH of the aqueous suspension within, a range from 7.5 to 12.0, bringing a volumetric ratio between the total volume of the aqueous suspension and the weight of the fibres to, or maintaining the volumetric ratio within, a range from 10:1 to 30:1 ml/g, to yield a final suspension (C), allowing the elastomeric composition to precipitate out of the final suspension (C);

(c) from 0 to 120 phr of a standard reinforcing filler;
(d) from 0.1 to 15 phr of a vulcanising agent; and
(e) from 0.1 to 20 phr of a coupling agent.

20. The tyre component as claimed in claim 19, wherein the vulcanisable elastomeric composition is at least partially vulcanised.

21. A tyre for vehicle wheels comprising at least one tyre component comprising a vulcanisable elastomeric composition comprising:

(a) 100 phr of one or more diene elastomers;
(b) from 10 to 200 phr of a solid master elastomeric composition prepared by a process comprising:

providing silicate fibres of nanometric size with needle-shaped morphology and an elastomeric latex comprising one or more diene elastomers and an aqueous phase, wherein a weight ratio of the fibres to the diene elastomer present in the latex is at least 0.5:1, combining the fibres and the latex to yield an aqueous suspension, bringing the pH of the aqueous suspension to, or maintaining the pH of the aqueous suspension within, a range from 7.5 to 12.0, bringing a volumetric ratio between the total volume of the aqueous suspension and the weight of the fibres to, or maintaining the volumetric ratio within, a range from 10:1 to 30:1 ml/g, to yield a final suspension (C), allowing the elastomeric composition to precipitate out of the final suspension (C);

(c) from 0 to 120 phr of a standard reinforcing filler;
(d) from 0.1 to 15 phr of a vulcanising agent; and
(e) from 0.1 to 20 phr of a coupling agent.

22. A tyre for vehicle wheels comprising at least one tyre component comprising a vulcanized elastomeric composition prepared by, at least partially, vulcanizing an elastomeric composition comprising:

(a) 100 phr of one or more diene elastomers;
(b) from 10 to 200 phr of a solid master elastomeric composition prepared by a process comprising:

providing silicate fibres of nanometric size with needle-shaped morphology and an elastomeric latex comprising one or more diene elastomers and an aqueous phase, wherein a weight ratio of the fibres to the diene elastomer present in the latex is at least 0.5:1, combining the fibres and the latex to yield an aqueous suspension, bringing the pH of the aqueous suspension to, or maintaining the pH of the aqueous suspension within, a range from 7.5 to 12.0, bringing a volumetric ratio between the total volume of the aqueous suspension and the weight of the fibres to, or maintaining the volumetric ratio within, a range from 10:1 to 30:1 ml/g, to yield a final suspension (C), allowing the elastomeric composition to precipitate out of the final suspension (C);

(c) from 0 to 120 phr of a standard reinforcing filler;
(d) from 0.1 to 15 phr of a vulcanising agent; and
(e) from 0.1 to 20 phr of a coupling agent.

* * * * *